(12) United States Patent
Kamineni et al.

(10) Patent No.: US 12,366,708 B2
(45) Date of Patent: Jul. 22, 2025

(54) PHOTONIC INTEGRATED CIRCUIT

(71) Applicant: Psiquantum, Corp., Palo Alto, CA (US)

(72) Inventors: Vimal Kumar Kamineni, Fremont, CA (US); Matteo Staffaroni, San Ramon, CA (US); Faraz Najafi, Palo Alto, CA (US); Ann Melnichuk, Rio Rancho, NM (US); George Kovall, Palo Alto, CA (US); Yong Liang, Niskayuna, NY (US)

(73) Assignee: Psiquantum, Corp., Palo Alto, CA (US)

( * ) Notice: Subject to any disclaimer, the term of this patent is extended or adjusted under 35 U.S.C. 154(b) by 224 days.

(21) Appl. No.: 18/082,520

(22) Filed: Dec. 15, 2022

(65) Prior Publication Data
US 2023/0123000 A1  Apr. 20, 2023

Related U.S. Application Data

(63) Continuation of application No. PCT/US2021/037422, filed on Jun. 15, 2021.
(Continued)

(51) Int. Cl.
*G02B 6/136* (2006.01)
*G02B 6/122* (2006.01)
*G02B 6/132* (2006.01)

(52) U.S. Cl.
CPC ............. *G02B 6/136* (2013.01); *G02B 6/122* (2013.01); *G02B 6/132* (2013.01)

(58) Field of Classification Search
CPC .... G02B 6/136; G02B 6/122; G02B 6/12026; G02B 6/12004; G02B 6/12002; G02B 6/132; G02B 6/13
See application file for complete search history.

(56) References Cited

U.S. PATENT DOCUMENTS 9,316,534 B1 * 4/2016 Kondratko ............. G01S 17/08
2002/0014639 A1 2/2002 Imai et al.
(Continued)

FOREIGN PATENT DOCUMENTS

CN 1495458 A 5/2004
CN 101833149 A 9/2010
(Continued)

OTHER PUBLICATIONS

PCT/US2021/037422, "International Preliminary Report on Patentability", Dec. 29, 2022, 8 pages.
(Continued)

*Primary Examiner* — Michael P Mooney
(74) *Attorney, Agent, or Firm* — Kilpatrick Townsend & Stockton LLP

(57) ABSTRACT

A device includes a substrate, a dielectric layer on the substrate, a waveguide within the dielectric layer, and a photodetector optically coupled to the waveguide. The photodetector is disposed above the waveguide layer and is monolithically integrated with the substrate. The photodetector is configured to operate at low temperatures, such as below about 50 K or about 20 K. In some embodiments, the monolithic photonic device includes thermal isolation structures and optical isolation structures. Techniques for manufacturing the monolithic photonic device, including the thermal isolation structures and optical isolation structures, are also described.

20 Claims, 25 Drawing Sheets

Related U.S. Application Data

(60) Provisional application No. 63/039,840, filed on Jun. 16, 2020.

(56) References Cited

U.S. PATENT DOCUMENTS

| | | | |
|---|---|---|---|
| 2007/0206899 A1* | 9/2007 | Chu | G02B 6/12007 385/5 |
| 2013/0343696 A1* | 12/2013 | Kim | G02B 6/12 385/14 |
| 2014/0299751 A1 | 10/2014 | Tang et al. | |
| 2015/0198775 A1 | 7/2015 | Sandhu | |
| 2015/0354938 A1* | 12/2015 | Mower | G06N 10/60 356/450 |
| 2016/0139350 A1* | 5/2016 | Heck | G02B 6/136 438/31 |
| 2019/0391348 A1 | 12/2019 | Osenbach et al. | |
| 2020/0028000 A1 | 1/2020 | Wang et al. | |

FOREIGN PATENT DOCUMENTS

| | | |
|---|---|---|
| CN | 104395797 A | 3/2015 |
| CN | 105431756 A | 3/2016 |
| JP | 2006191081 A | 7/2006 |
| JP | 2008522408 A | 6/2008 |
| WO | 2020087025 A1 | 4/2020 |

OTHER PUBLICATIONS

PCT/US2021/037422, "International Search Report and Written Opinion", Oct. 12, 2021, 11 pages.

EP21825176.7, "Extended European Search Report", Jun. 18, 2024, 9 pages.

Ferarri, et al., "Waveguide-Integrated Superconducting Nanowire Single-Photon Detectors", Nanophotonics, vol. 7, No. 11, Sep. 20, 2018, pp. 1725-1758.

Sacher, et al., "Monolithically Integrated Multilayer Silicon Nitride-on-Silicon Waveguide Platforms for 3-D Photonic Circuits and Devices", Institute of Electrical and Electronics Engineers, vol. 106, No. 12, Dec. 1, 2018, pp. 2232-2245.

TW110121680, "Office Action", Jan. 24, 2025, 14 pages.

JP2022-577233, "Office Action", Feb. 26, 2025, 17 pages.

CN2021800496984, "Office Action", May 23, 2025, 10 pages.

* cited by examiner

PHOTONIC INTEGRATED CIRCUIT

CROSS-REFERENCES TO OTHER APPLICATIONS

This application is a continuation of International Patent Application No. PCT/US2021/037422, entitled "Photonic Integrated Circuit" filed on Jun. 15, 2021, which claims priority to U.S. Provisional Patent Application No. 63/039,840, entitled "Photonic Integrated Circuit" filed on Jun. 16, 2020, the disclosures of which are hereby incorporated by reference in their entirety for all purposes.

BACKGROUND

Photonic integrated circuits, such as photonic integrated circuits in photonic quantum computing systems, may include various integrated optical components, such as waveguides, couplers, photon generators, filter, switches, detectors, interferometers, delay lines, and the like. Integrating different types of integrated optical components onto a single chip may be difficult due to the different processes and material used for fabricating these integrated optical components.

Integrating different types of integrated optical components onto a single chip may also negatively impact the performance of the photonic integrated circuits due to, for example, noises caused by stray lights or thermal dissipation from heat generating components to other components. For example, photodetectors with high sensitivity, such as single photon detectors, may be used in many photonic quantum technologies, such as quantum cryptography and quantum computing. Because of their high sensitivity, these photodetectors may be very susceptible to noise, such as undesired ambient light or stray light that may reach the photodetectors through direct or indirect paths. Certain thermo-optical components, such as thermal tuners for tuning filters, may use heaters. Heat generated by the heaters may dissipate to other regions of the photonic integrated circuit, which may reduce the efficiency of the thermo-optical components and/or may increase the temperature of other components that may need to operate at low temperatures, such as cryogenic temperatures.

SUMMARY

This disclosure relates generally to photonic integrated circuit. More specifically, this disclosure relates to techniques for integrating different types of components on a monolithic photonic integrated circuit. The monolithic photonic integrated circuit includes optical and/or thermal isolation structures. For example, the monolithic photonic integrated circuit may include optical isolation structures for preventing background light from reaching a highly sensitive photodetector (e.g., a superconducting nanowire single photon detector) in a photonic integrated circuit (PIC) in order to achieve the high sensitivity and high signal to noise ratio (SNR). The monolithic photonic integrated circuit may also include thermal isolation structures to reduce or prevent heat dissipation from some thermo-optic devices to other regions of the photonic integrated circuit. The monolithic photonic integrated circuit with optical and/or thermal isolation structures may be manufactured using a combination of semiconductor processing techniques. Various inventive embodiments are described herein, including methods, processes, systems, devices, and the like.

According to certain embodiments, the photonic integrated circuit may include a photonic integrated circuit for optical quantum computing. The photonic integrated circuit may include various combination of different types of integrated optical components, such as waveguides, couplers, photon generators, filters, switches, detectors, interferometers, delay lines, and the like. For example, the photonic integrated circuit may include single photon generators for generating individual photons, filters and switches that may be tuned or controlled by thermo-optic devices or other tuners, and single photon detectors to detect individual photons. The different types of integrated optical components may operate at different temperatures. For example, the single photon detector may include superconducting nanowire single photon detector that may operate at low temperature, while the thermo-optic device may operate at a much higher temperature.

According to certain embodiments, the photonic integrated circuit may include isolation structures fabricated using CMOS back end of line (BEOL) processes to prevent ambient light or stray light from reaching the photodetector directly or indirectly. The isolation structures may include, for example, metal layers, arrays of vias, air gaps, trenches filled with reflective or absorptive materials, and the like. The isolation structures may provide local and/or global isolations to photodetectors and/or waveguides at different locations including the input ports and output ports of the photonic integrated circuit and the photodetector, such that any scattered, reflected, diffused, or otherwise leaked light from either the light source or the photonic integrated circuit is partially or fully blocked and thereby prevented from reaching the photodetector.

Systems, devices, and methods disclosed herein can improve the signal to noise ratio of the photodetector by preventing undesired light from reaching the highly sensitive photodetector. As such, the photodetector may achieve a high sensitivity and may have a minimum amount of dead time. The isolation structures may be fabricated using standard CMOS back end of line (BEOL) processes or CMOS-compatible BEOL processes. Some isolations may be local isolations, and no additional global layers or materials may be needed in the stack-up, and hence no additional thermal loads may be added to the circuit and device.

According to certain embodiments, the photonic integrated circuit may include thermal isolation structures, such as trenches and large undercut regions adjacent to heat generating devices. The thermal isolation structures may also be fabricated using CMOS or other semiconductor processing techniques, such as photolithography and wet/dry etching. The thermal isolation structures may keep the heat in a localized region to both improve the efficiencies of the thermo-optic device and reduce the burden for cooling regions that may need to operate in low temperature.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 4A is a cross-sectional view of an optical device including a photodetector and light isolation structures. FIG. 4B is a perspective view of the optical device of FIG. 4A. FIG. 4C is a top view of the optical device of FIG. 4A. FIG. 4D is a top view of a cross-section of the optical device of FIG. 4A.

DETAILED DESCRIPTION

Figure 1:
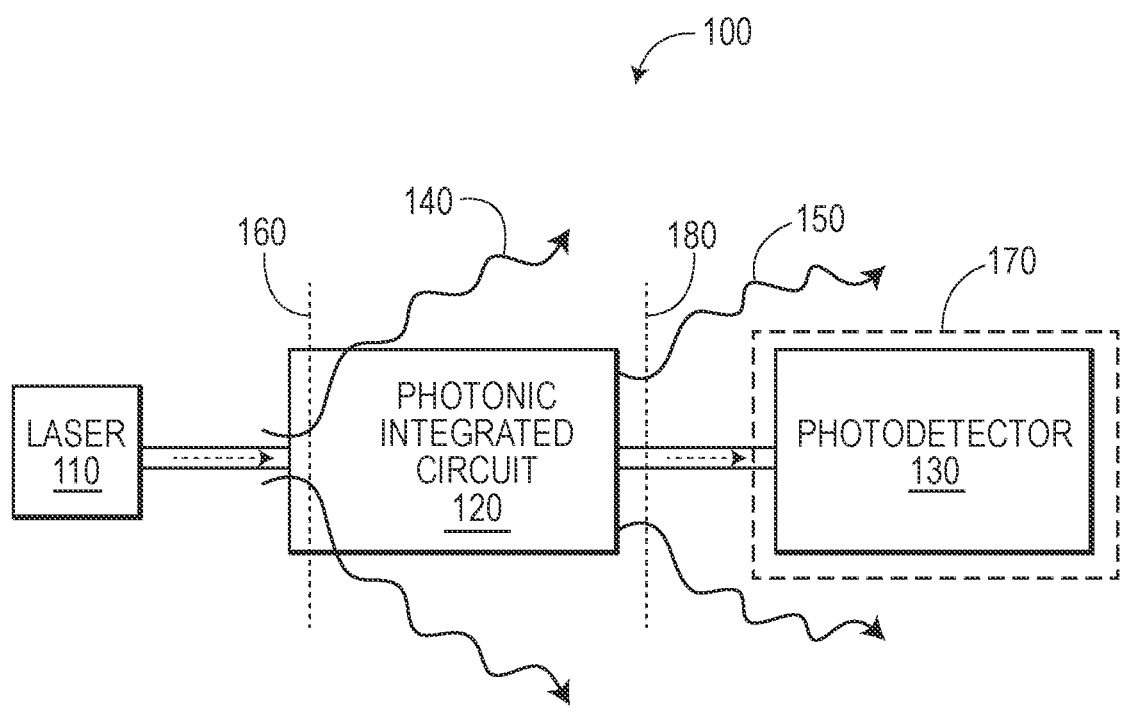
FIG. 1 is a simplified block diagram illustrating an example of an optical device including a photonic integrated circuit (PIC) and a highly sensitive photodetector according to certain embodiments.

Techniques disclosed herein relate generally to photonic integrated circuit. More specifically, this disclosure relates to techniques for integrating different types of components on a monolithic photonic integrated circuit. The monolithic photonic integrated circuit includes optical and/or thermal isolation structures. Various inventive embodiments are described herein, including methods, processes, systems, devices, and the like.

According to certain embodiments, the photonic integrated circuit may include various combination of different types of integrated optical components, such as waveguides, couplers, photon generators, filters, switches, detectors, interferometers, delay lines, and the like. For example, the photonic integrated circuit may include a photonic integrated circuit for optical quantum computing, and may include single photon generators for generating individual photons, filters and switches that may be tuned or controlled by thermo-optic devices or other tuners, and single photon detectors to detect individual photons. The different types of integrated optical components may operate at different temperatures. For example, the single photon detector may include superconducting nanowire single photon detector that may operate at low temperature, while the thermo-optic device may operate at a much higher temperature.

The monolithic photonic integrated circuit may include optical isolation structures for preventing background light from reaching a highly sensitive photodetector (e.g., a single photon detector) in a photonic integrated circuit (PIC) in order to achieve the high sensitivity and high signal to noise ratio (SNR). The monolithic photonic integrated circuit may also include thermal isolation structures to reduce or prevent heat dissipation from some thermo-optic devices to other regions of the photonic integrated circuit. The monolithic photonic integrated circuit with optical and/or thermal isolation structures may be manufactured using a combination of semiconductor processing techniques.

Photodetectors with high light sensitivity, such as single photon detectors (SPDs, e.g., superconducting nanowire SPDs (SNSPDs)) used in many photonic quantum technologies, may be very sensitive to many kinds of light radiation. In many cases, the highly sensitive photodetectors may not achieve the sensitivity or SNR that they can potentially achieve due to various noise sources, such as noise caused by background light including stray light in a system or ambient light entering the system. Techniques disclosed herein can reduce or prevent undesired background light (such as stray light or ambient light) from reaching a highly sensitive photodetector (e.g., superconducting nanowire single photon detector) in a photonic integrated circuit in order to achieve high sensitivity and high signal to noise ratio.

According to certain embodiments, in order to improve the sensitivity and the SNR of a photodetector, the photodetector (e.g., SNSPD) may be optically isolated from background radiation (e.g., ambient light or stray light) using reflective or absorptive structures surrounding the photodetector. In some embodiments, additional isolation structures may be added at any other location in the PIC where background light may otherwise propagate before reaching the photodetector, so as to reduce the number of stray photons that may reach the region of the photodetector. For example, because one main source of background or stray light in a photonic integrated circuit is the light reflected, scattered, or diffused at optical input and/or output ports (e.g., input or output waveguide couplers) of the PIC due to imperfect coupling of light into or out of the PIC (e.g., waveguides), isolation structures may be used at the optical input and/or output ports to prevent stray light from entering the interior of the PIC. As such, the probability that any stray light or ambient light may enter the waveguides or reach the region of the photodetector may be significantly reduced. Furthermore, even if any background light reaches the region where the photodetector is located, the local isolation structures surrounding the photodetector may block the background light to prevent it from being detected by the photodetector. In various embodiments, the light isolation structures may be fabricated using standard CMOS back end of line (BEOL) processes or other CMOS-compatible fabrication processes.

According to certain embodiments, the photonic integrated circuit may include heaters for tuning some integrated optical components, such as optical filters, optical switches, optical interferometers, and the like. The photonic integrated circuit may also include thermal isolation structures, such as trenches and large undercut regions adjacent to the heaters. The thermal isolation structures may keep the heat in a localized region to both improve the efficiencies of the thermo-optic device and reduce the burden for cooling regions including devices that may need to operate in low temperature, such as the SNSPDs. The thermal isolation structures may also be fabricated using CMOS or other semiconductor processing techniques, such as photolithography and wet/dry etching.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 is a simplified block diagram illustrating an example of an optical device 100 including a photonic integrated circuit (PIC) 120 and a highly sensitive photodetector 130 according to certain embodiments. PIC 120 may include photonic circuits formed by waveguides and other active or passive optical components, such as filters, resonators, splitters, optical amplifiers, and the like. The optical device may include a light source, such as a laser 110, which may be an ultra-fast (e.g., picosecond or femtosecond) pulsed laser. In some embodiments, the light source may be an external source and may be connected to PIC 120 through, for example, one or more optical fibers. Light from the light source may be coupled into the waveguides in PIC 120 through a coupler, such as a grating coupler, an edge coupler, or the like. However, it may be difficult to achieve a very high coupling efficiency. For example, in many cases, the coupling efficiency may be less than 90%, less than 75%, less than 60%, or less than 50%. Therefore, a large amount of light from the light source may not enter the waveguides in PIC 120, and may instead be reflected, scattered, or diffused and become stray light 140. Stray light 140 may be reflected, refracted, diffracted, or otherwise deflected by structures or components in optical device 100, such as metal layers, interfaces between different materials, and the like. Therefore, a portion of stray light 140 may eventually reach photodetector 130. In addition, some portions of PIC 120 may also leak light from the desired path. For example, light may be coupled out of a waveguide, instead of being guided within the photonic circuit to reach photodetector 130, for example, when the waveguide has a sharp turn or when there are defects in the waveguide or other photonic circuits. Light leaked out from the photonic circuits may become stray light 150, which may also be deflected at least partially to photodetector 130. In some embodiments, ambient light may also enter PIC 120, for example, through the oxide layers and/or be reflected by metal layers.

Photodetector 130 may be a highly sensitive photodetector, such as a single photon detector. For example, in some embodiments, photodetector 130 may include a superconducting nanowire single photon detector that can detect individual photons. In one embodiment, photodetector 130 may include a waveguide coupled to a superconducting nanowire, such as a niobium-germanium nanowire, which may have a ultralow resistance in the superconducting state. The superconducting nanowire may be photosensitive or photoactive, such as absorptive for photons. For example, photons passing through the waveguide may be absorbed by the superconducting nanowire and cause the superconducting nanowire to become non-superconducting (i.e., changing resistance or impedance). The resistance or impedance change in the nanowire may be converted into an electrical detection signal (e.g., a current or voltage signal) that indicates one or more photons are detected.

When at least a portion of stray light 140 and 150 reaches photodetector 130, it may cause the superconducting nanowire to change state, and photodetector 130 may generate a detection signal indicating that one or more photons are detected even through no photon reaches the superconducting nanowire from the waveguide, or the magnitude of the detection signal may not correctly indicate the number of photons reaching the photodetector from the waveguide. Thus, false detection signals or incorrect (e.g., noisy) detection signals may be generated by photodetector 130, which may reduce the effective sensitivity or SNR of photodetector 130.

According to certain embodiments, light isolation structures may be added at different locations of optical device 100 to block the stray light or ambient light from reaching photodetector 130. For example, an isolation structure 160 may be added at the input port of PIC 120, an isolation structure 170 may be fabricated to surround photodetector 130, and an isolation structure 180 may be added anywhere in optical device 100 where background light may otherwise propagate. More details of some embodiments of the light isolation structures and their fabrication processes are described in the following examples.

Figure 2:
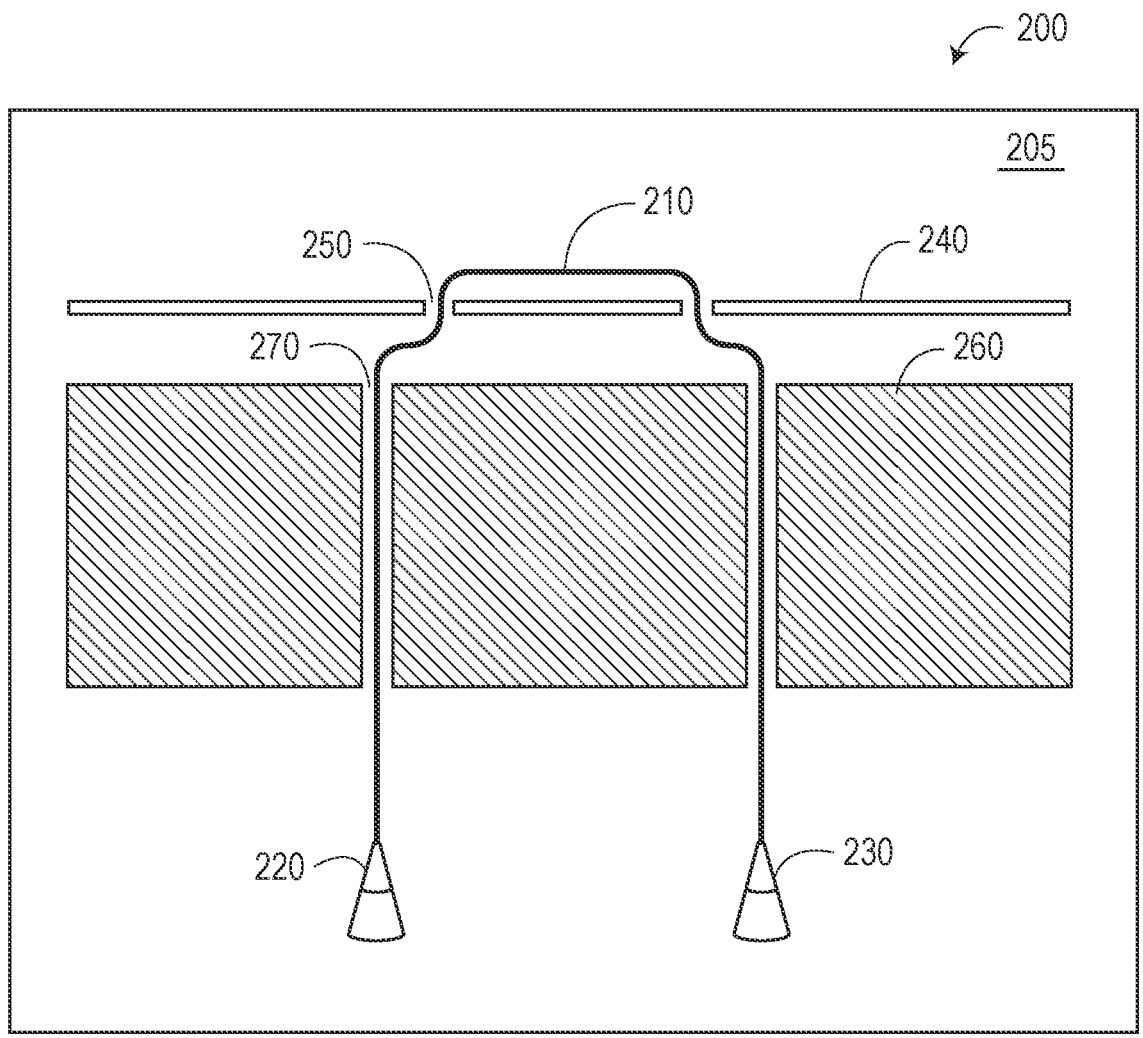
FIG. 2 illustrates an example of stray light isolation at input and/or output ports of a photonic integrated circuit according to certain embodiments.

FIG. 2 illustrates an example of stray light isolation at input and/or output ports of a photonic integrated circuit 200 according to certain embodiments. FIG. 2 shows a cross-section view of PIC 200, which may include a waveguide 210 fabricated on a substrate 205 (e.g., a silicon handle wafer). PIC 200 may also include an input port 220 for waveguide 210 and an output port 230 for waveguide 210. Waveguide 210 may carry light from input port 220 into the interior of PIC 200, where some photosensitive components may be located, or may guide light out of PIC 200 through output port 230.

As described above, light may not be perfectly coupled into or out of waveguide 210 at input port 220 or output port 230. A significant portion of input light or output light may enter PIC 200 through paths other than waveguide 210. In some cases, in each laser pulse, about $10^{12}$ photons may enter PIC 200 as stray light. To prevent these photons from reaching the interior of PIC 200, one or more light isolation structure may be fabricated at the input port and/or the output port. For example, as illustrated in FIG. 2, PIC 200 may include one or more metal trenches 240 and one or more deep trenches 260 that may act as isolation structure 160 shown in FIG. 1. Metal trenches 240 may include a metal layer that is sufficiently thick to block (e.g., reflect or absorb) incident photons. Metal trenches 240 may act as a mirror-like barrier and may extend from, for example, metal 1 (M1, which may be about 1 μm above waveguide 210), down to substrate 205 (which may be about 2-3 μm below waveguide 210) to block light that may propagate in the cladding of waveguide 210 from reaching the interior of PIC 200. Deep trenches 260 may extend through substrate 205 of PIC 200, and may be empty (i.e., air gaps) or may be filled with reflective or absorptive materials to at least partially reflect or absorb incident photons that may propagate in or may be scattered from substrate 205, such that the photons may not enter the cladding of the waveguide.

Gaps 250 may exist between adjacent metal trenches 240 such that waveguide 210 may pass through the gaps between metal trenches 240. Gaps 270 may exist between adjacent deep trenches 260 such that waveguide 210 may be supported by the substrate at gaps 270. As shown in FIG. 2, gaps 250 and gaps 270 may not be aligned and may be offset from each other by a certain distance, such that gaps 250 may not be in the line of sight of stray photons from input port 220, and thus stray photons from input port 220 may not pass though gaps 250 and may instead be blocked by metal trenches 240.

Figure 3:
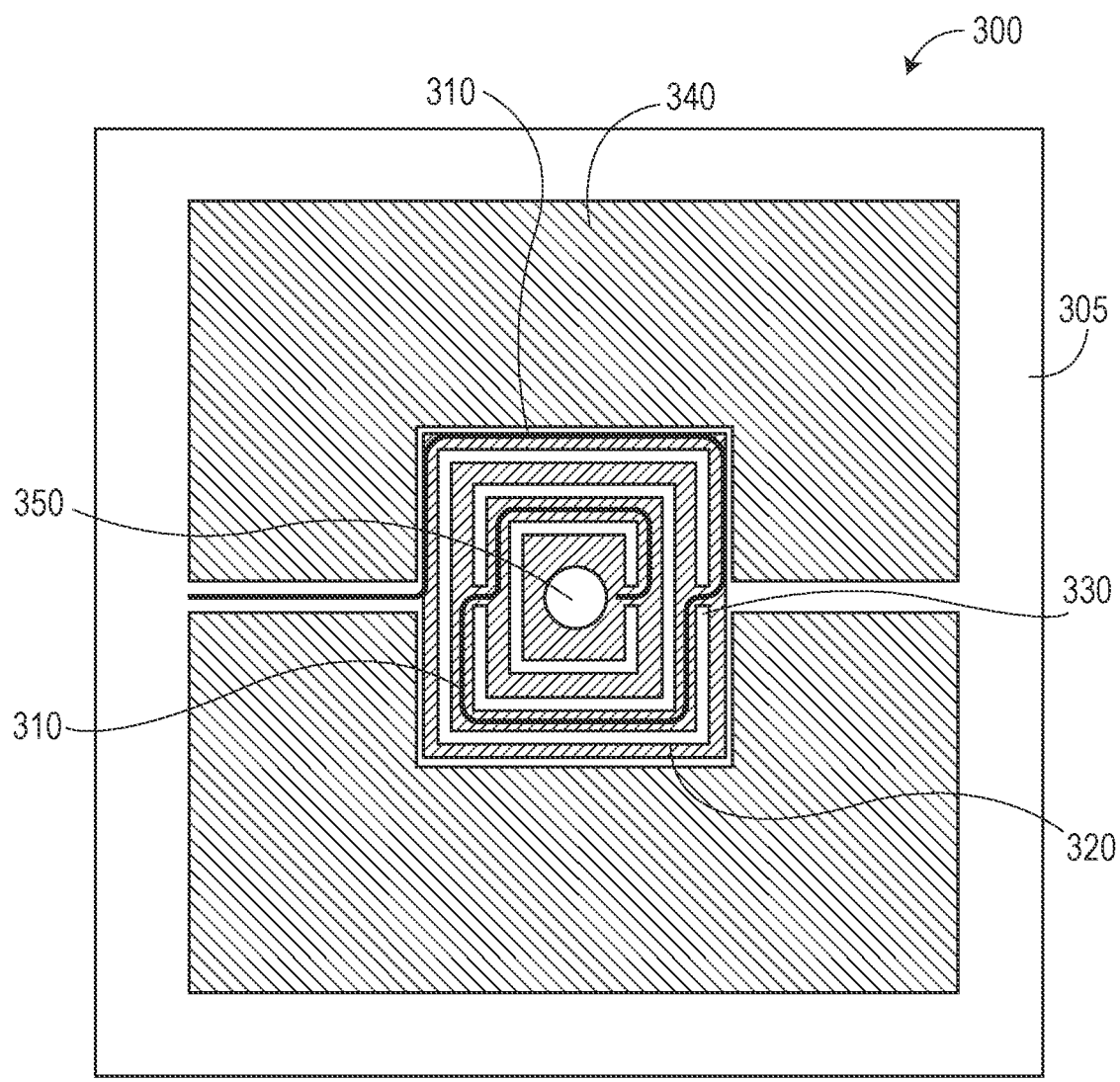
FIG. 3 illustrates an example of locally isolating a photodetector using various isolation structures according to certain embodiments.

FIG. 3 illustrates an example of locally isolating a photodetector 350 using various isolation structures in a photonic integrated circuit 300 according to certain embodiments. PIC 300 may include a substrate 305 (e.g., a silicon handle wafer). A waveguide 310 may be formed on substrate 305, where waveguide 310 may include multiple turns to change directions. Light isolation structures, such as a top metal cover 320, metal trenches 330, and deep trenches 340, may be fabricated in PIC 300 to surround and isolate waveguide 310 and photodetector 350. The light isolation structures shown in FIG. 3 may be a specific embodiment of isolations structure 170 of FIG. 1, and may form an isolation structure that may be compared to a castle-like structure.

As illustrated in FIG. 3, waveguide 310 may carry signal light from photonic circuits in PIC 300 to photodetector 350 (e.g., an SNSPD), where the signal light may be detected. Similar to deep trenches 260, deep trenches 340 may include an air gap that passes completely through substrate 305 or may be filled with reflective or absorptive materials. In some embodiments, deep trenches 340 may pass partially through substrate 305. Deep trenches may isolate photodetector 350 from light that may propagate in or may be scattered from substrate 305. Metal trenches 330 may be similar to metal trenches 240 and may create a mirror-like barrier that may extends from M1 down to substrate 305 as described above with respect to FIG. 2. In some embodiments, metal trenches 330 may include multiple nested rings centered around photodetector 350, where an inner ring may be enclosed by one or more outer rings. Each ring may include an opening where waveguide 310 may pass through. The opening in each ring may be on a different side (e.g., an opposite side or an adjacent side) with respect to the opening in an adjacent ring. Metal trenches 330 may block light that may propagate in the cladding of waveguide 310 from reaching photodetector 350. Top metal cover 320 may serve as a roof of the light isolation structure, which may be compared to a castle-like structure, and may prevent light from reaching photodetector 350 from the top of photodetector 350 and PIC 300.

Figure 4A:
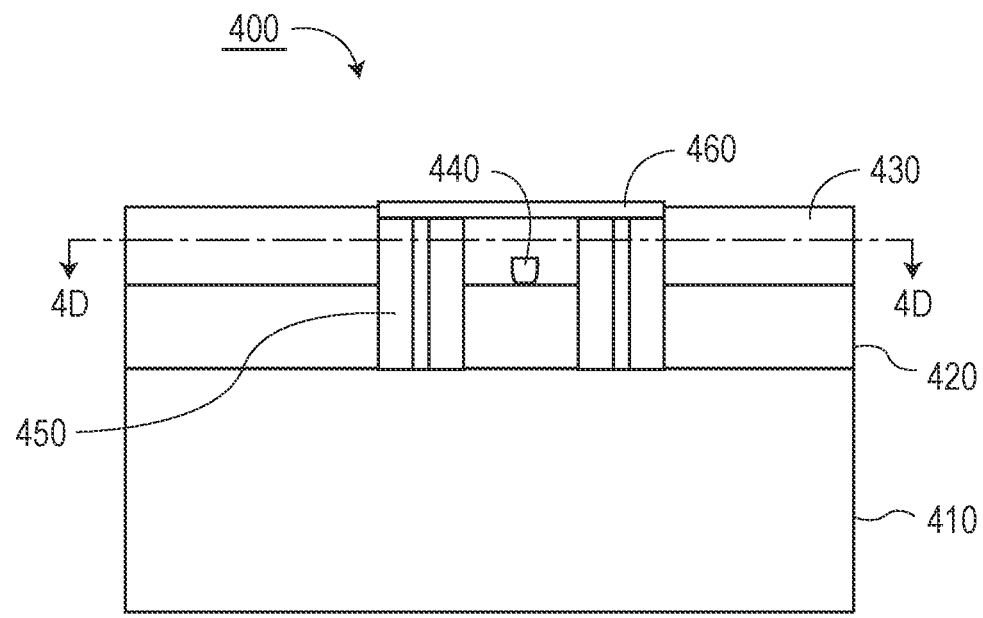
FIGS. 4A-4D illustrate another example of locally isolating a photodetector using various isolation structures in an optical device according to certain embodiments.
Figure 4B:
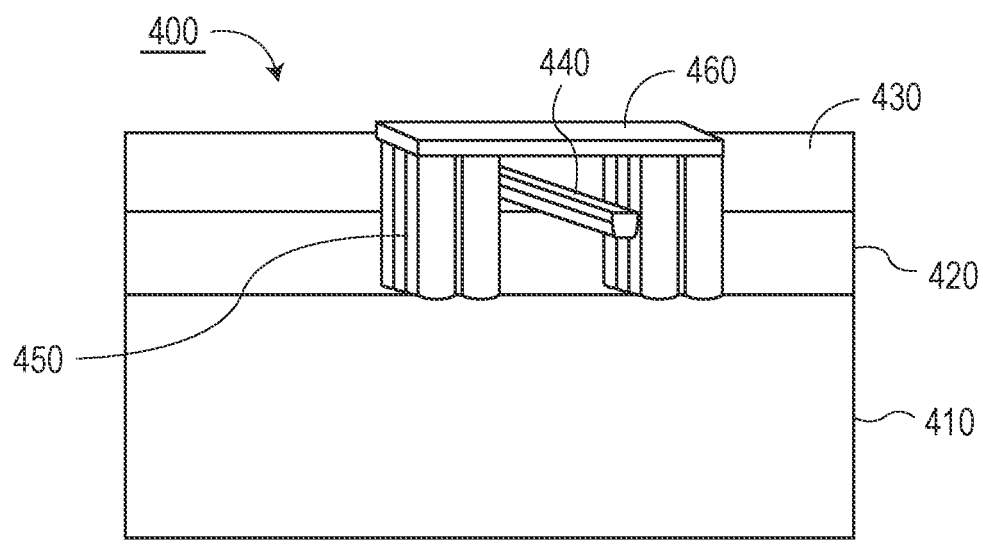

FIGS. 4A-4D illustrate another example of locally isolating a photodetector 470 using various isolation structures in an optical device 400 according to certain embodiments. FIG. 4A is a cross-sectional view of optical device 400 including photodetector 470 and light isolation structures surrounding photodetector 470. FIG. 4B is a perspective view of optical device 400 shown in FIG. 4A. Optical device 400 may include a substrate 410 (e.g., a silicon handle wafer), a barrier oxide (BOX) layer 420 (e.g., silicon dioxide), a waveguide 440 formed on top of BOX layer 420, and a low temperature oxide (LTO) layer 430 covering waveguide 440. Optical device 400 may also include an array of vias 450 and a top metal cover 460 that may be formed on metal 1 layer.

Figure 4C:
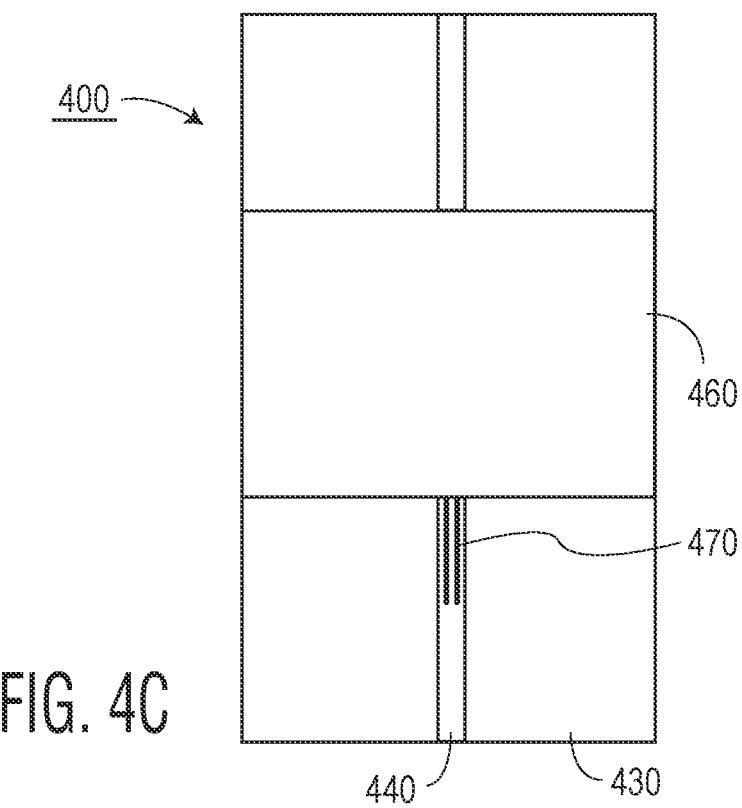

FIG. 4C is a top view of optical device 400 of FIG. 4A. FIG. 4C shows top metal cover 460 covering photodetector 470 from the top such that background light may not reach photodetector 470 from the top, where top metal cover 460 may be a part of the metal 1 layer.

Figure 4D:
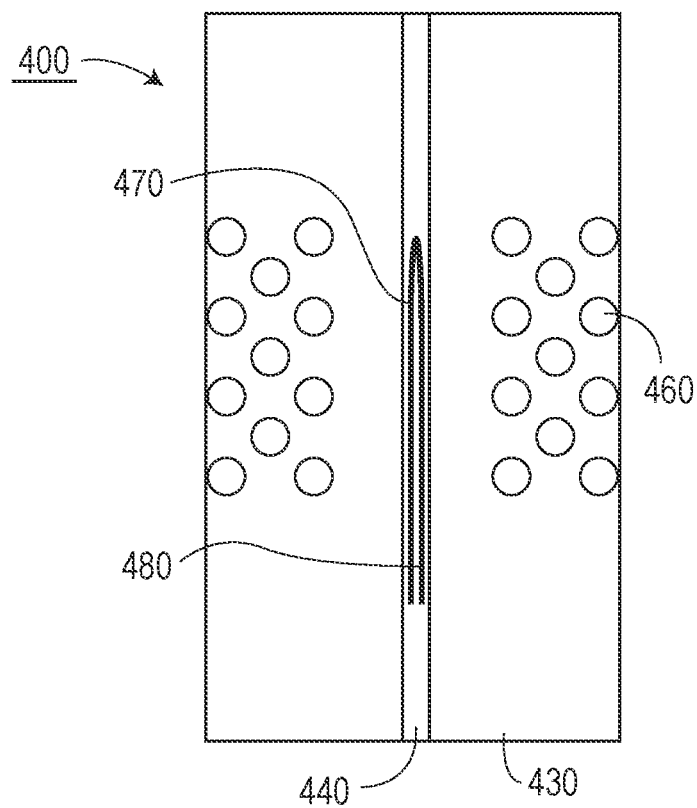

FIG. 4D is a top view of a cross-section of optical device 400 of FIG. 4A. FIG. 4D shows the arrangement of the array of vias 450 and photodetector 470. As illustrated, the array of vias 450 may be arranged in a two-dimensional array, where vias in one row (or column) may be offset from vias in adjacent rows (or columns) such that the array of vias may effectively form a wall. Photodetector 470 may include a photoactive nanowire 480 (e.g., a niobium-germanium nanowire) on waveguide 440.

Figure 5:
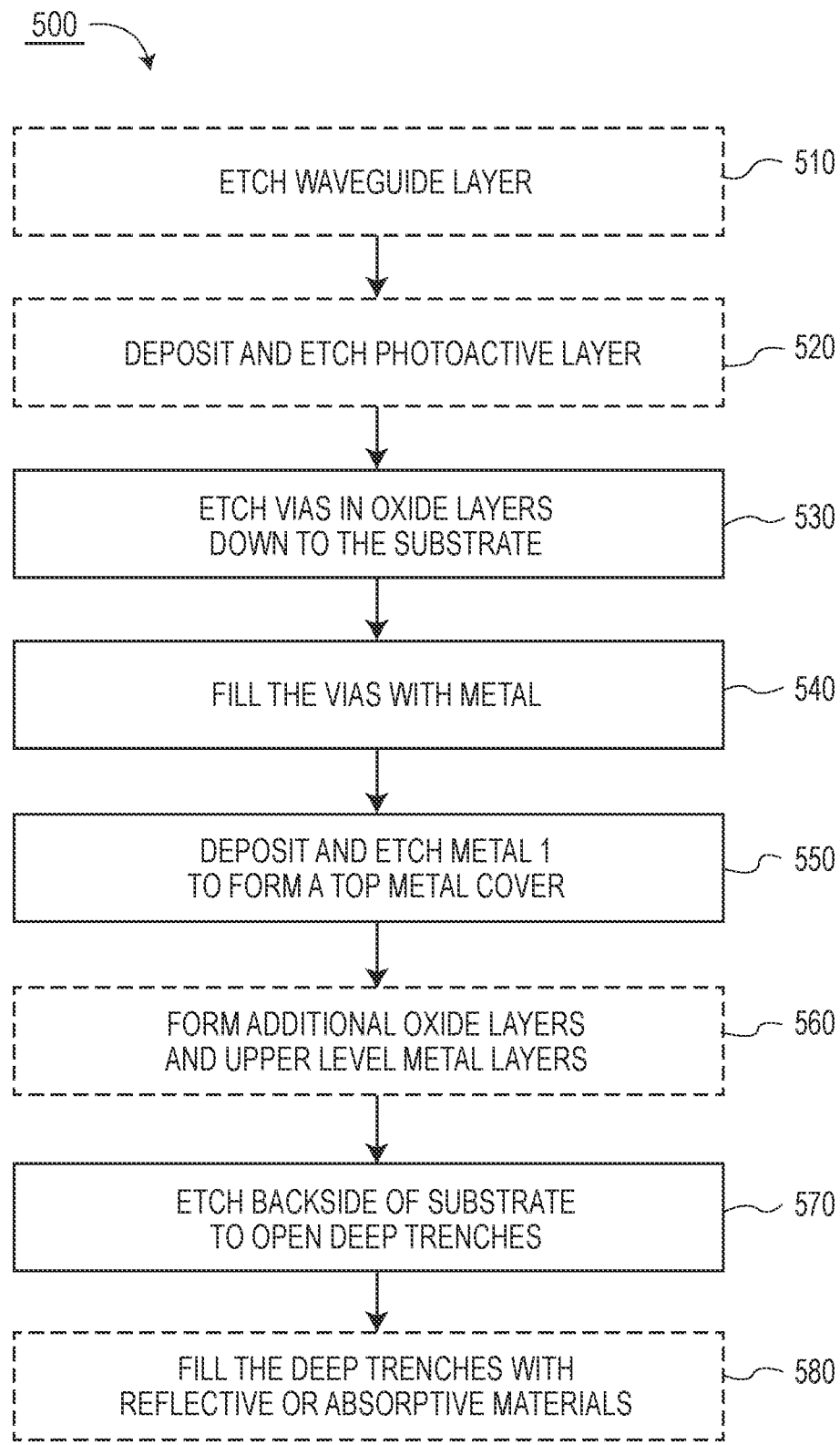
FIG. 5 is a flow chart illustrating an example method of fabricating various light isolation structures in a photonic integrated circuit according to certain embodiments.

FIG. 5 is a flow chart 500 illustrating an example method of fabricating various light isolation structures in a photonic integrated circuit according to certain embodiments. Even though FIG. 5 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation.

Optionally, at block 510, a waveguide layer may be formed on a barrier oxide layer of a PIC, such as BOX layer 420 shown in FIGS. 4A and 4B. The waveguide layer may be patterned and etched using, for example, photolithography techniques, to form the waveguide core and/or input/output couplers. At block 520, a photoactive layer, such as a niobium-germanium layer, may be deposited on top of the waveguide layer. The photoactive layer may be patterned and etched to form a nanowire on an area of the waveguide core. Processing at block 510 and block 520 may be part of the front end of line processes in the CMOS processes.

Figure 6:
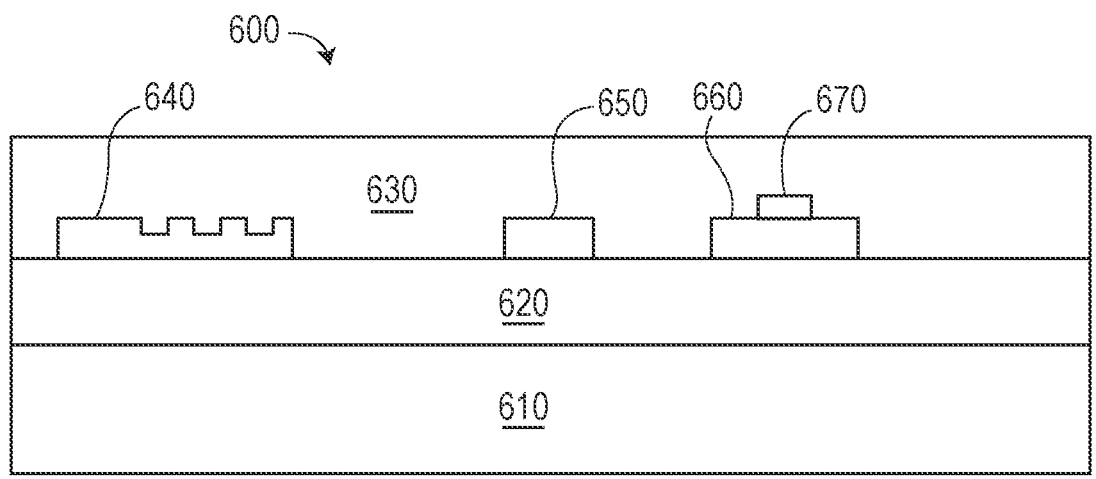
FIG. 6 is a cross-sectional view of an example of a photonic integrated circuit including a photodetector and manufactured using front end of line processes according to certain embodiments.

FIG. 6 is a cross-sectional view of an example of a photonic integrated circuit 600 including a photodetector manufactured using the front end of line processes at blocks 510 and 520 according to certain embodiments. PIC 600 may include a substrate 610 (e.g., a silicon handle wafer), a BOX layer 620 formed on substrate 610, various devices (e.g., optical input/output coupler 640, waveguide 650, and a photodetector including a waveguide 660 and a nanowire 670 including a photoactive material) on a device layer, and an oxide layer 630 covering the device layer. Optical input/output coupler 640 may include a grating coupler. Oxide layer 630 and BOX layer 620 may act as the cladding of waveguide 650. In one example, oxide layer 630 may have a thickness of about 1 μm.

At block 530, vias or trenches may be etched in the oxide layers down to the substrate. For example, a patterned mask layer may be formed on the oxide layers (e.g., the LTO layer and BOX layer), and wet or dry etching techniques may be used to etch vias (holes) or trenches in the oxide layers, which may have a total thickness of, for example, 3-4 μm.

Figure 7:
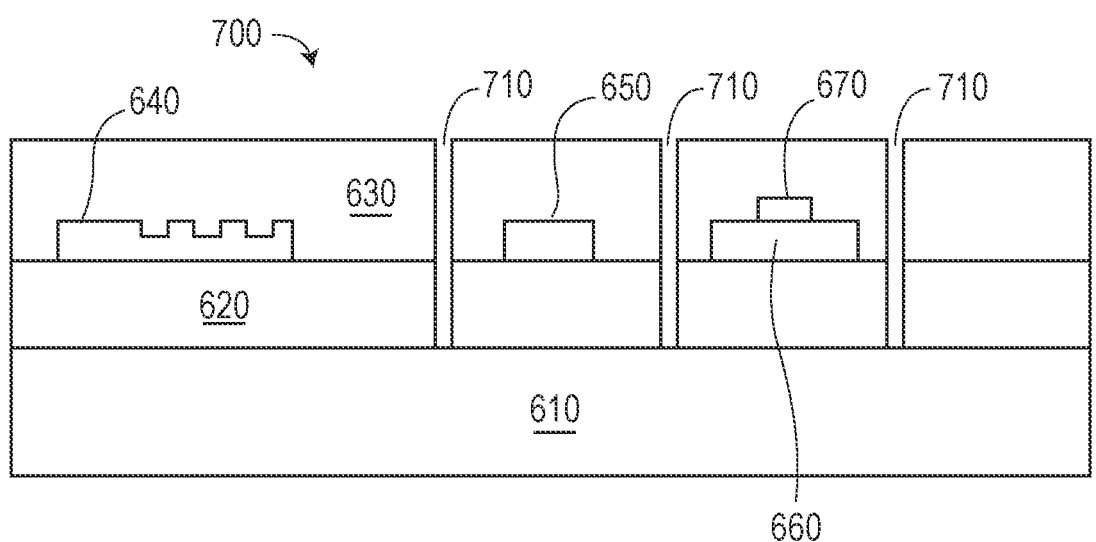
FIG. 7 is a cross-sectional view of an example of a photonic integrated circuit with vias or trenches etched in the oxide layer using back end of line processes according to certain embodiments.

FIG. 7 is a cross-sectional view of an example of a photonic integrated circuit 700 with vias or trenches 710 etched in oxide layers using back end of line (BEOL) processes at block 530 according to certain embodiments. PIC 700 may be made from PIC 600. Vias or trenches 710 may be etched through oxide layer 630 and BOX layer 620 down to substrate 610.

At block 540, the vias or trenches may be filled with reflective or absorptive materials, such as metal materials. For example, metal layers may be deposited on the oxide layers and selectively etched in one or more cycles to form metal plugs in the vias or trenches.

Figure 8:
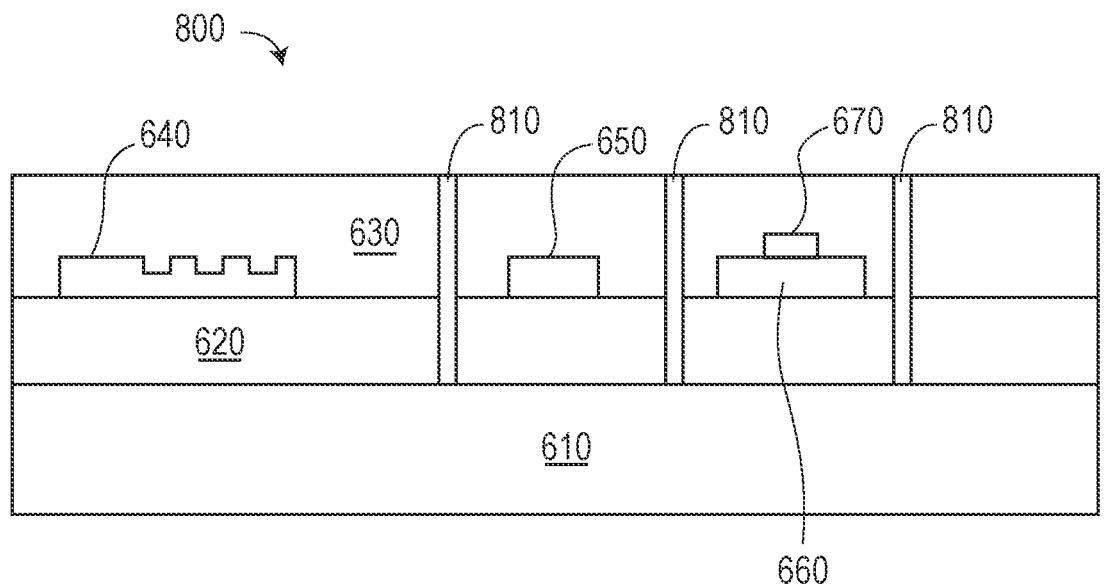
FIG. 8 is a cross-sectional view of an example of a photonic integrated circuit with the vias or trenches etched in the oxide layer filled with reflective or absorptive materials (e.g., metals) according to certain embodiments.

FIG. 8 is a cross-sectional view of an example of a photonic integrated circuit 800 with the vias or trenches etched in the oxide layers filled with reflective or absorptive materials (e.g., metals such as copper, aluminum, cobalt, tungsten, etc.) using the BEOL process at block 540 according to certain embodiments. PIC 800 may be made from PIC 700, where vias or trenches 710 may be filled with metal plugs 810.

At block 550, standard CMOS BEOL processing techniques may be used to deposit a metal 1 layer on the oxide layers and etch the metal 1 layer to leave a top metal cover in an area on top of the photodetector. The top metal cover may be aligned with the vias or trenches that are filled with reflective or absorptive materials, such as metals. Therefore, the top metal cover and the vias or trenches may block background light from at least 3 (e.g., top, left, and right) or 5 (e.g., top, left, right, front, and rear) directions.

Figure 9:
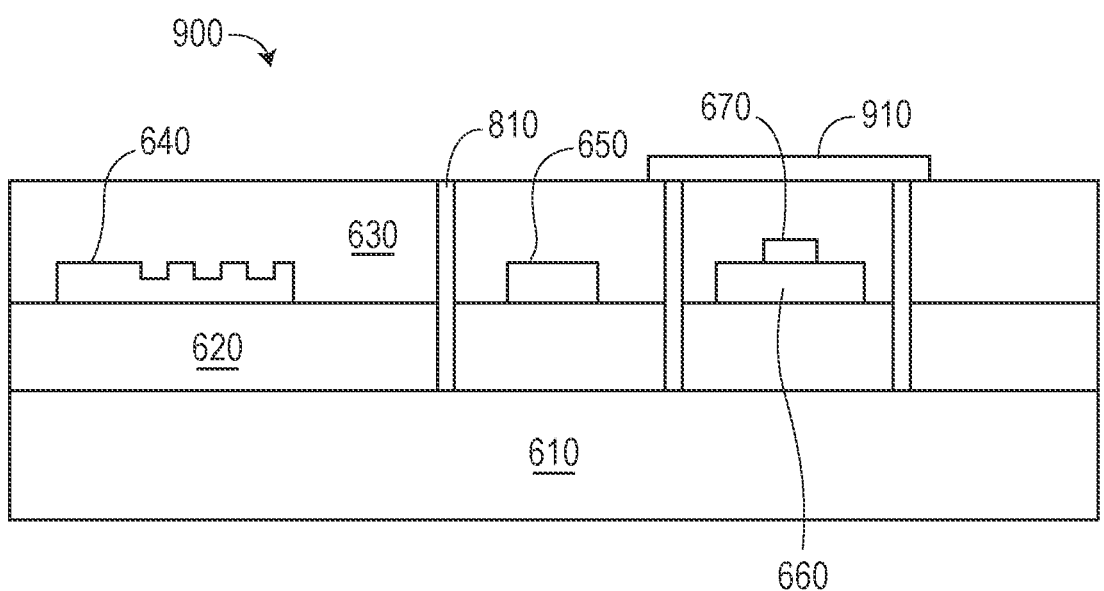
FIG. 9 is a cross-sectional view of an example of a photonic integrated circuit with a metal cover fabricated on a metal layer for locally isolating the photodetector according to certain embodiments.

FIG. 9 is a cross-sectional view of an example of a photonic integrated circuit 900 with a top metal cover 910 fabricated as part of a metal layer for locally isolating the photodetector using the BEOL process at block 550 according to certain embodiments. PIC 900 may be made from PIC 800 and may include the additional top metal cover 910 formed as part of the metal 1 layer. Top metal cover 910 may be positioned above (e.g., on top of) the photodetector that includes waveguide 660 and nanowire 670. Top metal cover 910 may be in contact with metal plugs 810 in vias or trenches 710 to block light from top, left, and right directions in the 2-D cross-sectional view.

Optionally, at block 560, other BEOL processes may be performed to form, for example, additional dielectric (e.g., oxide) layers and upper metal layers (e.g., metal 2, metal 3, etc.). The BEOL processes may include standard CMOS BEOL processes.

Figure 10:
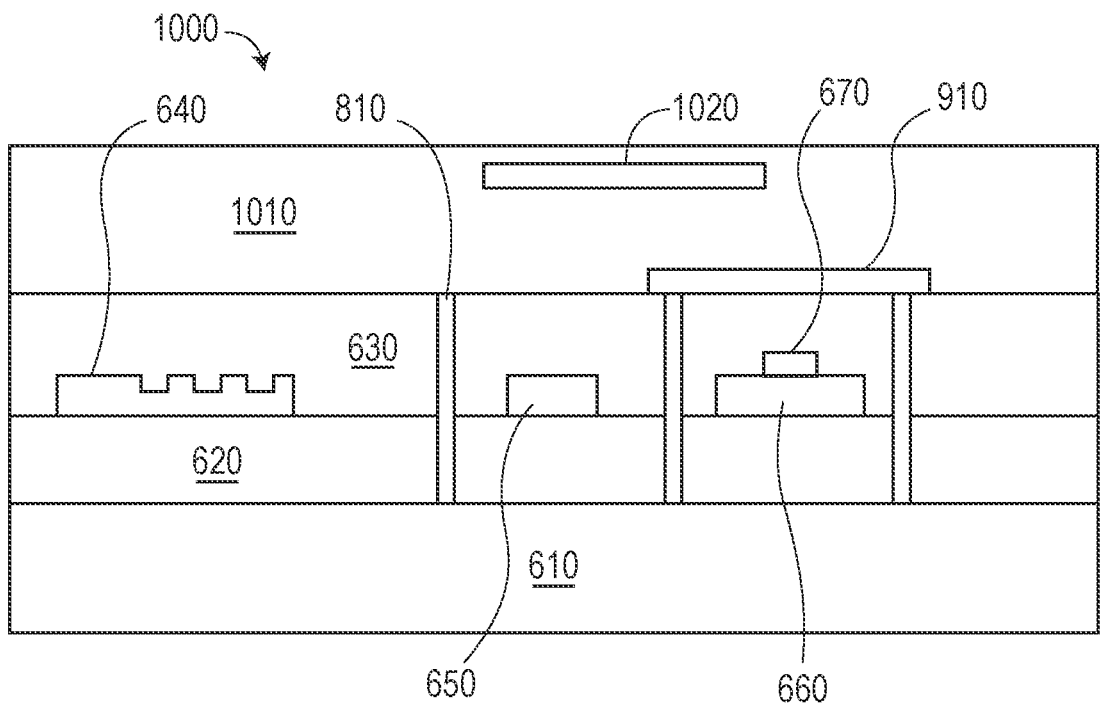
FIG. 10 is a cross-sectional view of an example of a photonic integrated circuit after additional BEOL processes according to certain embodiments.

FIG. 10 is a cross-sectional view of an example of a photonic integrated circuit 1000 after the additional BEOL processes at block 560 according to certain embodiments. PIC 1000 may be made from PIC 900 and may include additional metal layers 1010 and upper level metal layers, such as metal layer 1020.

At block 570, the substrate may be etched from the backside to form deep trenches in the substrate from the backside. The deep trenches may reflect photons propagating within the substrate at interfaces between the substrate material and the air gap. For example, total internal reflection may occur when photons are incident at a certain angle on the interface from the substrate material to the air gap.

Figure 11:
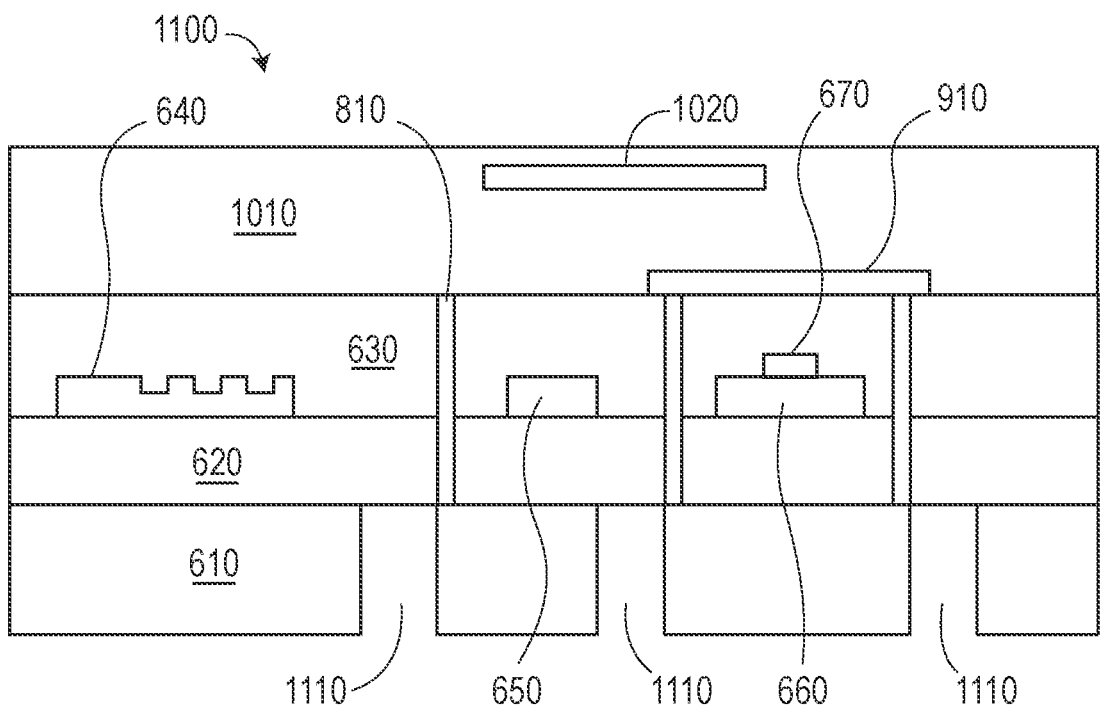
FIG. 11 is a cross-sectional view of an example of a photonic integrated circuit including deep trenches etched in a substrate of the photonic integrated circuit according to certain embodiments.

FIG. 11 is a cross-sectional view of an example of a photonic integrated circuit 1100 including deep trenches 1110 etched in a substrate of the photonic integrated circuit using the BEOL process at block 570 according to certain embodiments. PIC 1100 may be made from PIC 1000 and may include deep trenches 1110 in substrate 610. Deep trenches 1110 may be offset from metal plugs 810. For example, deep trenches 1110 may be slightly farther away from the photodetector than metal plugs 810 to prevent light from circumventing metal plugs 810 from substrate 610 and bottom side of BOX layer 620 and reaching the photodetector.

Optionally, at block 580, the deep trenches may be filled with reflective or absorptive materials that may block light, such as metal materials.

Figure 12:
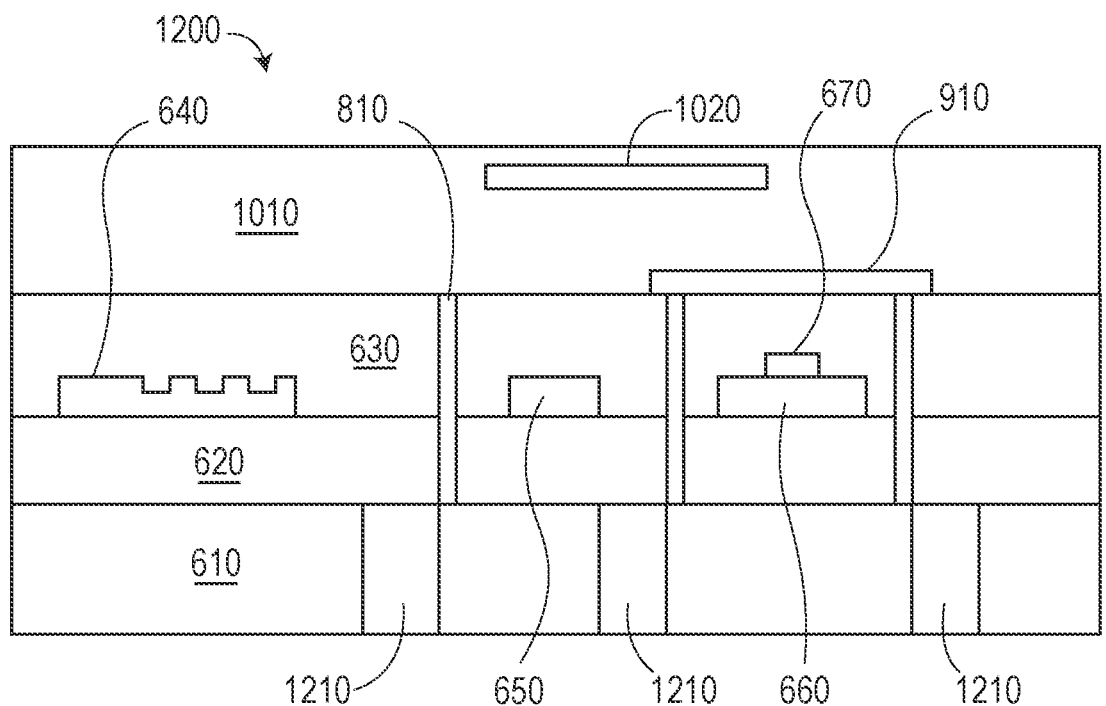
FIG. 12 is a cross-sectional view of an example of a photonic integrated circuit including deep trenches filled with reflective or absorptive materials in a substrate of the photonic integrated circuit according to certain embodiments.

FIG. 12 is a cross-sectional view of an example of a photonic integrated circuit 1200 including the deep trenches in the substrate filled with reflective or absorptive materials using the process at block 580 according to certain embodiments. PIC 1200 may be made from PIC 1100, and may include reflective or absorptive materials 1210, such as metal materials, filled in deep trenches 1110.

Figure 13:
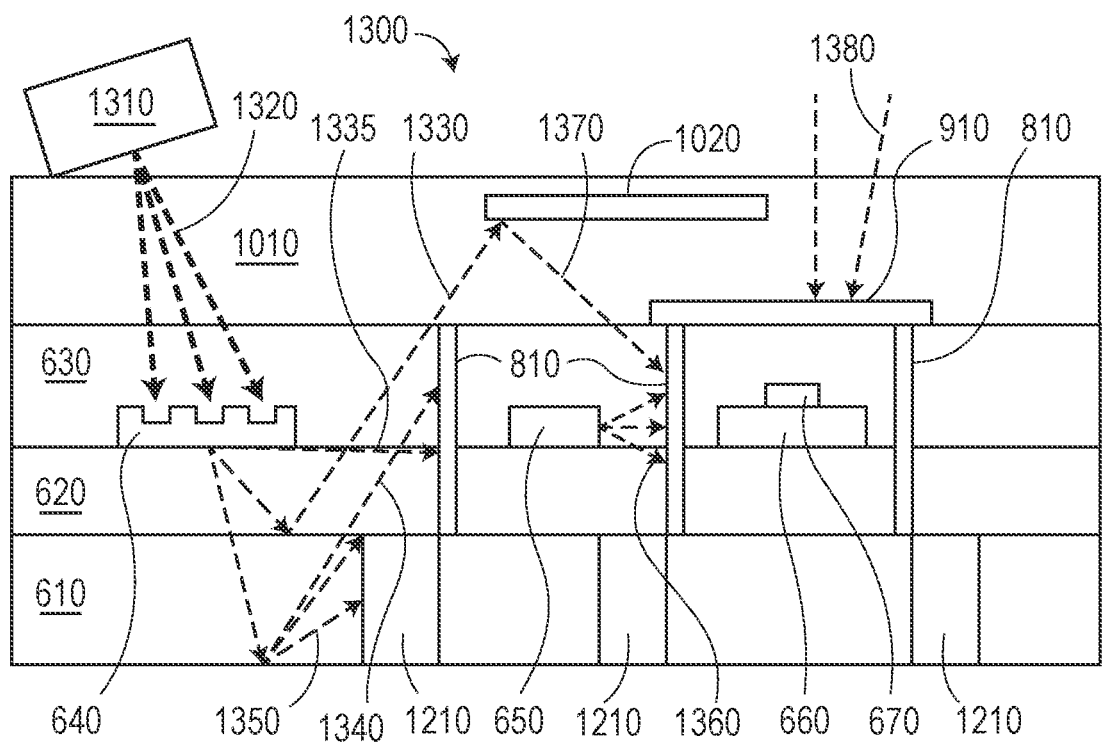
FIG. 13 is a cross-sectional view of an example of a photonic integrated circuit illustrating light isolation by various isolation structures in the photonic integrated circuit according to certain embodiments.

FIG. 13 is a cross-sectional view of photonic integrated circuit 1200 illustrating light isolation by various isolation structures in the photonic integrated circuit according to certain embodiments. Light from a laser may be sent to PIC 1200 through an input fiber 1310, which may include a collimator, such as a GRIN lens or a micro lens. Input light 1320 from input fiber 1310 may propagate through the oxide layers and may be partially coupled into the waveguides in PIC 1200 by optical input/output coupler 640, which may include slanted gratings in some embodiments.

Light that is not coupled into the waveguides by optical input/output coupler 640 may be scattered in various directions. For example, a portion of input light 1320 may be reflected at the interface between substrate 610 and BOX layer 620 as light 1330, which may be further reflected by metal layer 1020 as light 1370 that may be blocked by one of metal plugs 810. A portion of input light 1320 may be scattered as light 1335, which may propagate towards a metal plug 810 and blocked by the metal plug. A portion of input light 1320 may be scattered at the bottom surface of substrate 610, where one portion of scattered light 1350 may be blocked by the reflective or absorptive material 1210 in a deep trench 1110, and another portion of scattered light 1340 may be blocked by a metal plug 810.

Light 1360 scattered or otherwise leaked from waveguide 650 may also be blocked by a metal plug 810 from reaching the photodetector. Ambient light 1380 that may enter the oxide layers from the top or stray light reflected by various metal layers may be blocked by top metal cover 910 on top of the photodetector, and thus may not reach the photodetector either. In this way, only photons guided in waveguide 660 may reach the photodetector, and thus background noises can be significantly reduced or substantially eliminated. As such, a high sensitivity and a high SNR may be achieved by the photodetector.

In various embodiments, other dielectric layers used in CMOS processing may be used to replace one or more oxide layers (e.g., silicon dioxide layers) described above. For example, the dielectric layers may include silicon nitride, alkali halides, barium titanate, lead titanate, tantalum oxide, tungsten oxide, zirconium oxide, and the like.

The highly sensitive photodetectors described above may be used to detect individual photons in quantum computing or quantum cryptography. For example, single photon sources may be used in many photonic quantum technologies. An ideal single photon source would generate single photons deterministically. One way to achieve a deterministic single photon source is to use cascaded (or multiplexed) heralded photon sources based on, for example, spontaneous four wave mixing (SFWM) or spontaneous parametric down-conversion (SPDC) in passive nonlinear optical media. In each heralded photon source (HPS), photons may be non-deterministically produced in pairs (which includes a signal photon and an idler photon), where one photon (e.g., signal photon) heralds the existence of the other photon (e.g., idler photon) in the pair. Thus, if a signal photon is detected by a highly sensitive photodetector (e.g., a single photon detector as described above) at one heralded photon source, the corresponding idler photon can be used as the output of the single photon source, while other heralded photon sources in the cascaded (or multiplexed) heralded photon sources of the single photon source can be bypassed or switched off.

Figure 14:
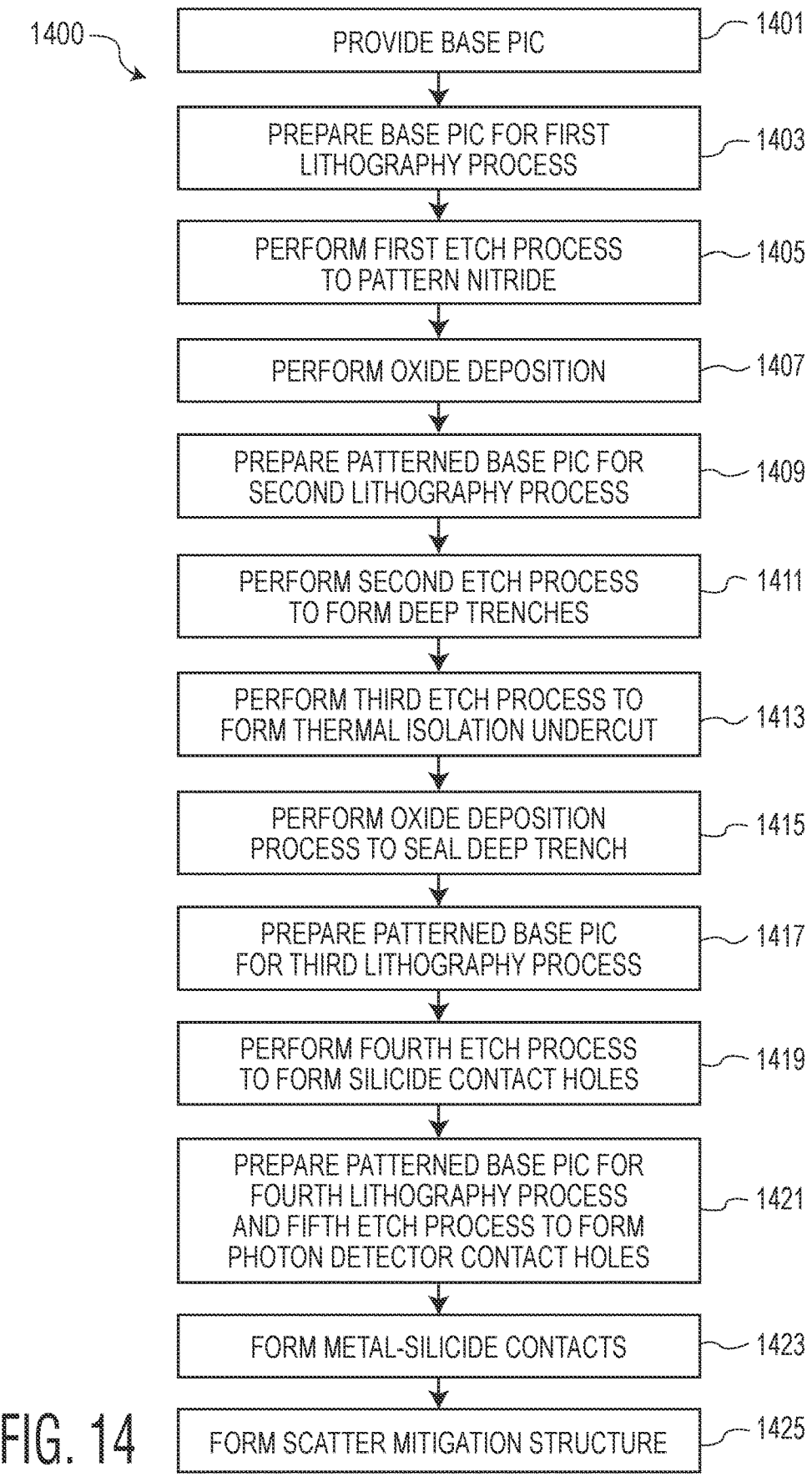
FIG. 14 is a flow chart illustrating an example method of fabricating a photonic integrated circuit according to certain embodiments.

FIG. 14 is a flow chart 1400 illustrating an example method of fabricating a photonic integrated circuit according to certain embodiments. More specifically, FIG. 14 shows one example of an integration flow for forming thermal isolation structures, scattered light mitigation structures, photodetectors, and metal contacts on and within a base photonic integrated circuit (PIC). Other combinations of elements are possible without departing from the scope of the present disclosure. For example, the method may not include the steps for forming the thermal isolations structures or other structures, such as additional photonic structures formed in one or more additional photonic layers.

In step 1401, the base PIC is provided. This base PIC can be any integrated circuit structure, and thus the example shown here is not intended to limit the scope of the present disclosure. In some embodiments, the base PIC can be provided as an output of any earlier sequence of processing steps, for example, silicon photonics processing steps for processing a silicon on insulator (SOI) wafer, and the like.

Figure 15:
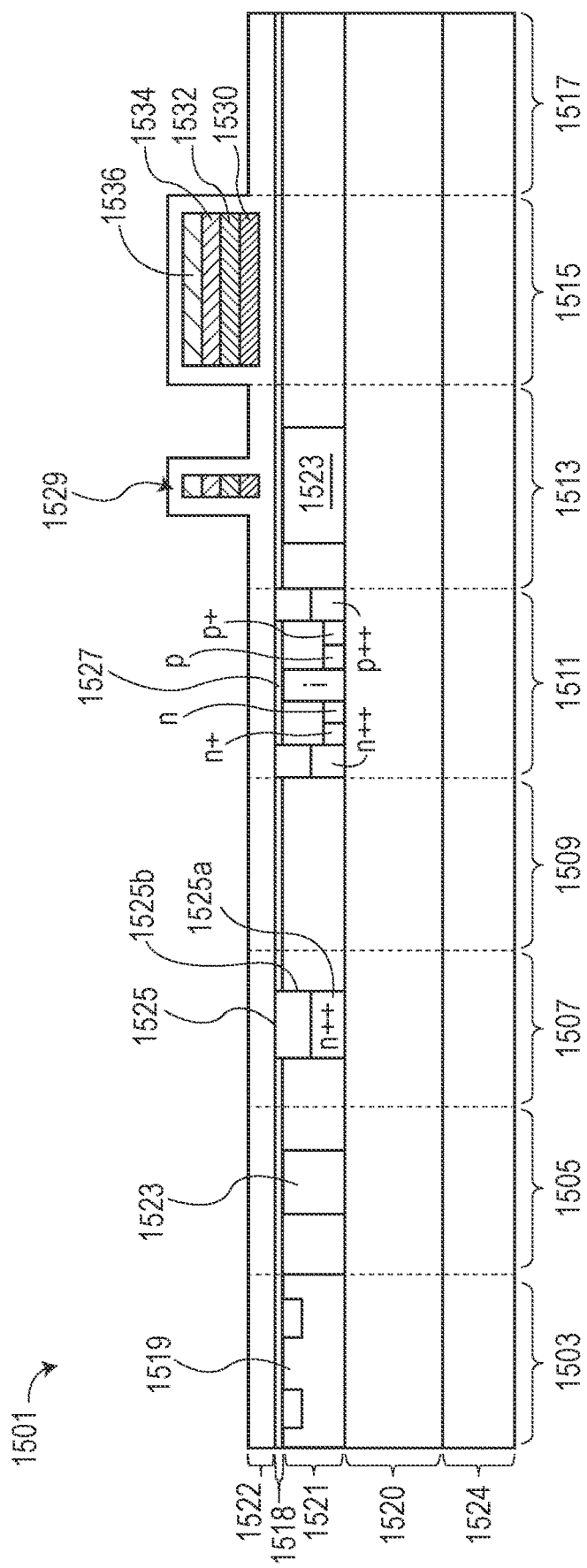
FIG. 15 illustrates an example of a type of base PIC according to certain embodiments.

An example of one type of base PIC that can be provided in step 1401 is shown in FIG. 15. The base PIC may include a PIC stack 1501. PIC stack 1501 includes a multi-layer photonic integrated circuit stack, including a substrate 1524 (e.g., a silicon handle wafer), a first oxide layer 1520, a waveguide layer 1521, and a spacer/protective cap layer 1522. In some embodiments, a second oxide layer 1518 can be disposed between the waveguide layer 1521 and the spacer/protective capping layer 1522. The waveguide layer 1521 can be patterned to include various photonic components, including one or more input coupler regions 1503, waveguide regions 1505, heater regions 1507, thermal isolation trench regions 1509, photonics switch regions 1511, photon detector regions 1513, photon detector contact regions 1515, and/or scatter mitigation structure regions 1517. One of ordinary skill in the art will appreciate that the number, ordering, and position of the various regions and components shown here are merely illustrative and any arrangement is possible without departing from the scope of the present disclosure.

In some embodiments, the input coupler region 1503 can include any type of photonic input/output structure(s), such as a grating coupler 1519. The photonic input/output structure can be previously formed in a waveguide layer 1521, such as in a Si layer, a SiN layer, or any other material suitable for integrated photonics. The waveguide region 1505 can include one or more waveguides 1523 that can be part of one or more photonic structures and/or photonic components. For example, within the waveguide layer 1521, waveguide structures can be used to form input/output structures (such as grating couplers), light routing structures (such as straight linear waveguides and waveguide bends), light generation structures (such as coupled microring photon sources), switch structures (such as Mach-Zehnder interferometers (MZI)), coupling structures (such as directional couplers), optical filters (e.g., wavelength-division multiplexed (WDM) wavelength filters), photonic delay line structures, and the like.

In the example illustrated in FIG. 15, the structures within the waveguide layer are arranged in a pictorial manner to facilitate the description of the manufacturing process. One of ordinary skill will appreciate that the precise arrangement of the components (and interconnection between the components) can vary widely depending on the application for which the PIC is designed. As such, the waveguide layer 1521 shown is intended to represent any possible combination of photonic components that can be designed using one or more waveguides as building blocks.

Heater region 1507 can also be part of one or more optical components, such as filters, microrings, and MZIs (not shown), and can be used to thermally tune these structures. In some embodiments, a heater 1525 (e.g., a strip heater) can be located in the heater region 1507. In some embodiments, heater 1525 can be formed in the waveguide layer 1521, and may include a doped silicon (n- or p-doped silicon) layer 1525a and a capping layer 1525b formed of silicide, such as cobalt silicide, nickel silicide, or any other silicide. While the heater region 1507 is shown to be adjacent to the waveguide 1523 in FIG. 15, other embodiments can employ silicide and/or metal heaters that are fabricated on top of the waveguide 1523 and can employ doped Si with a silicide top layer, metal materials such as TiN, TaN, or any other suitable heater material.

In some embodiments, thermal isolation trench region 1509 is adjacent to heater region 1507 such that a trench and undercut (not shown) can be formed in silicon oxide and silicon regions in subsequent processes to provide thermal isolation around heater 1525, as described in more detail below in reference to FIGS. 19-20. Such a trench and undercut can not only lead to more power efficient operation of the heater 1525 (by causing a reduced heating of the adjacent oxide layer and substrate) but also can provide thermal isolation between the region of the PIC that includes the heater 1525 (which may have a local temperature of 150 K-200 K) and the region of the PIC that includes the photon detectors (which may be at cryogenic temperatures, e.g., have a local temperature of 3 K-20 K, e.g., 4 K, 10 K, etc.). In some embodiments, many heaters may be used to tune many photonic components (e.g., single photon sources, filters, MZIs, etc.) that are located in close proximity to one another, the thermal isolation regions can prevent cross-talk between the heating of the components, such that one heater for heating a respective component may only minimally heat an adjacent component due to the thermal isolation properties of the thermal isolation structures that are formed in the thermal isolation regions. In some embodiments, thermal tuning may not be necessary and thus the heaters and heater regions may not be present.

In some embodiments, the photonics switch region 1511 includes any suitable photonic switch 1527, such as a p-n switch, a p-i-n switch, a DC Kerr switch, a Pockels effect switch, or any other type of optical switch.

In some embodiments, the photon detector region 1513 and photon detector contact region 1515 can employ any waveguide integrated photon detection technology. For example, shown here in cross-section is a superconducting nanowire single photon detector 1529. The photon detector region 1513 and photon detector contact region 1515 may include, for example, an AlN layer 1530, a NbN layer 1532, an amorphous silicon layer 1534, and a silicon oxide layer 1536. Details of the photon detector region 1513 and photon detector contact region 1515 are described below.

Surrounding the photon detector region 1513 can be a scatter mitigation structure region 1517 that can include one or more scatter mitigation structures (not shown) fabricated therein, such as the scatter mitigation structures described above in reference to FIGS. 1-13.

In accordance with some embodiments, the base PIC can be covered with a spacer/protective cap layer 1522 shown in FIG. 15, such as a SiN layer. Spacer/protective cap layer 1522 can be previously conformally deposited on top of the base PIC wafer. In other embodiments, the base PIC can include a planarized capping layer or any other layer without departing from the scope of the present disclosure.

Figure 16:
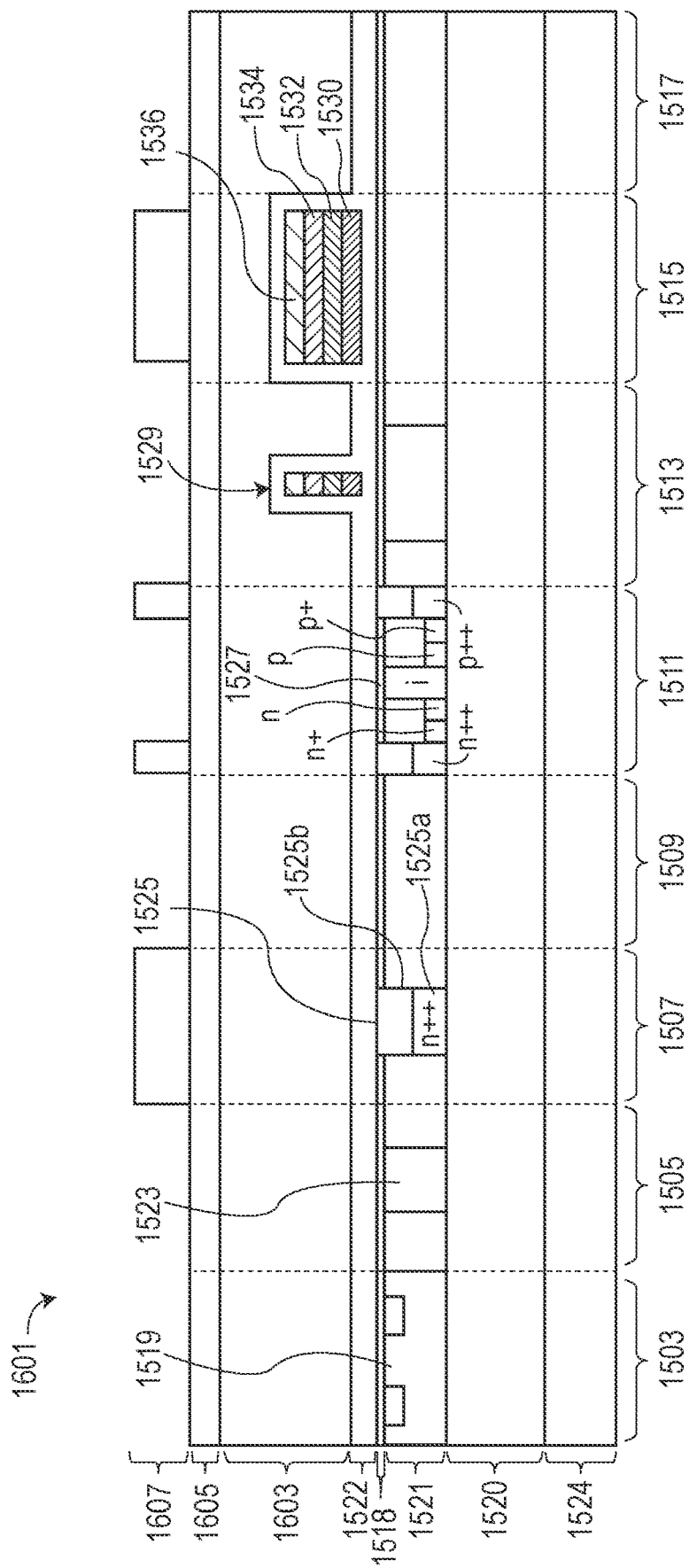
FIG. 16 illustrates examples of additional layers that can be deposited for use in a tri-layer lithography process according to certain embodiments.

Referring back to FIG. 14, in step 1403, the base PIC is prepared for a first lithography process. While the lithography processes referred to herein employs tri-layer lithography, any lithographic technique can be used without departing from the scope of the present disclosure. FIG. 16 shows examples of additional layers that can be deposited for use in a tri-layer lithography process. For example, a planarization layer 1603 can be deposited on the previously formed spacer layer (e.g., spacer/protective cap layer 1522). Examples of planarization layer 1603 include organic planarization layers, such as a spin-on hard mask (SOH), organic planarizing layer (OPL), or any other layer or material that can be used to planarize the topography of the top layer of the base PIC. An anti-reflective coating 1605 can be deposited on top of the planarizing layer. Examples of anti-reflective coating 1605 include silicon-based anti-reflective coating (SiARC), bottom anti-reflective coating (BARC), and the like. On top of anti-reflective coating 1605 is deposited a photoresist layer 1607, which can be lithographically patterned according to known methods. In the example shown in FIG. 16, the photoresist layer 1607 is patterned to protect certain portions of the spacer layer (e.g., nitride layer) that are located on top of the heater, switch, and photon detector contact regions, as shown in FIG. 16.

Figure 17:
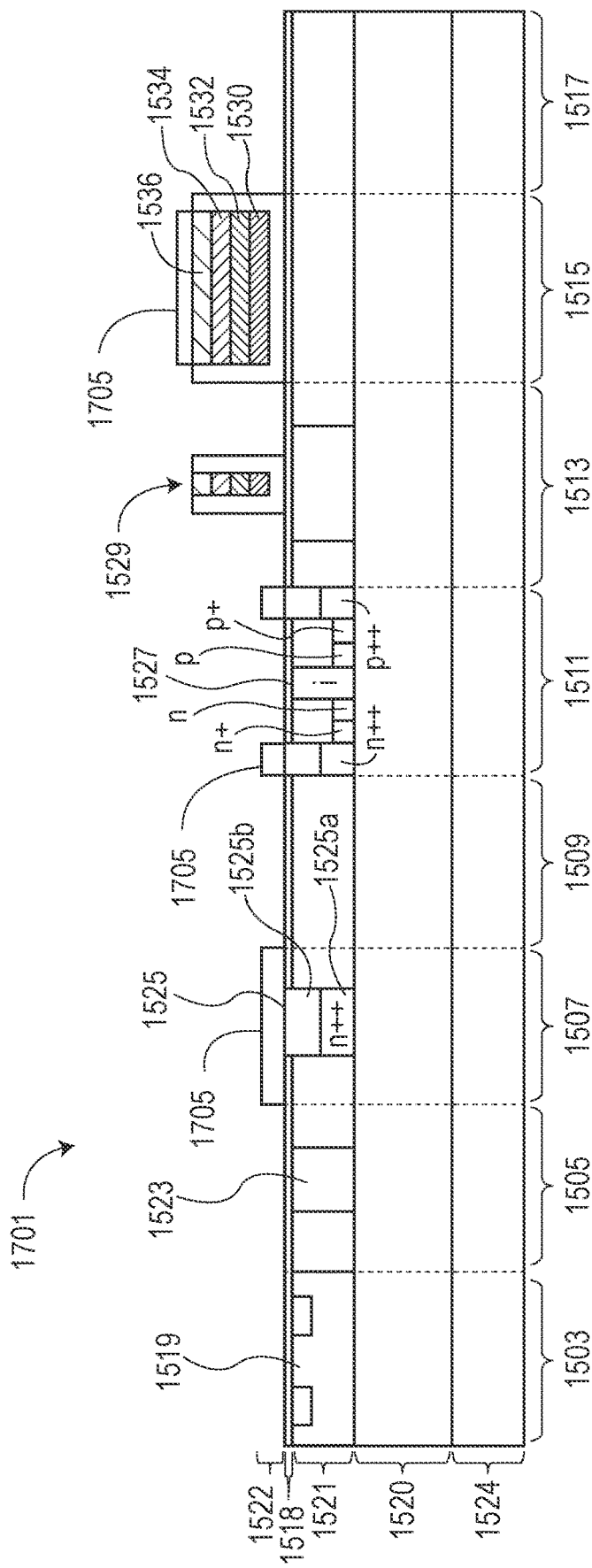
FIG. 17 illustrates an example of a etched PIC structure according to certain embodiments.

In step 1405, a first etch process is performed to pattern the spacer/protective cap layer 1522 (e.g., a nitride layer). For example, the anti-reflective coating 1605 and planarization layer 1603 are etched in the regions that do not contain the photoresist (acting as an etch mask), resulting in the etched PIC structure 1701 shown in FIG. 17, where spacers/caps 1705 (e.g., silicon nitride) remain on the top portions of the heater contact regions, switch contact regions, and photon detector contact regions. More generally, the photoresist can be lithographically patterned in any way that preserves islands of the SiN layer. These islands can be used as, for example, etch stops during the subsequent contact formation etch process.

Figure 18:
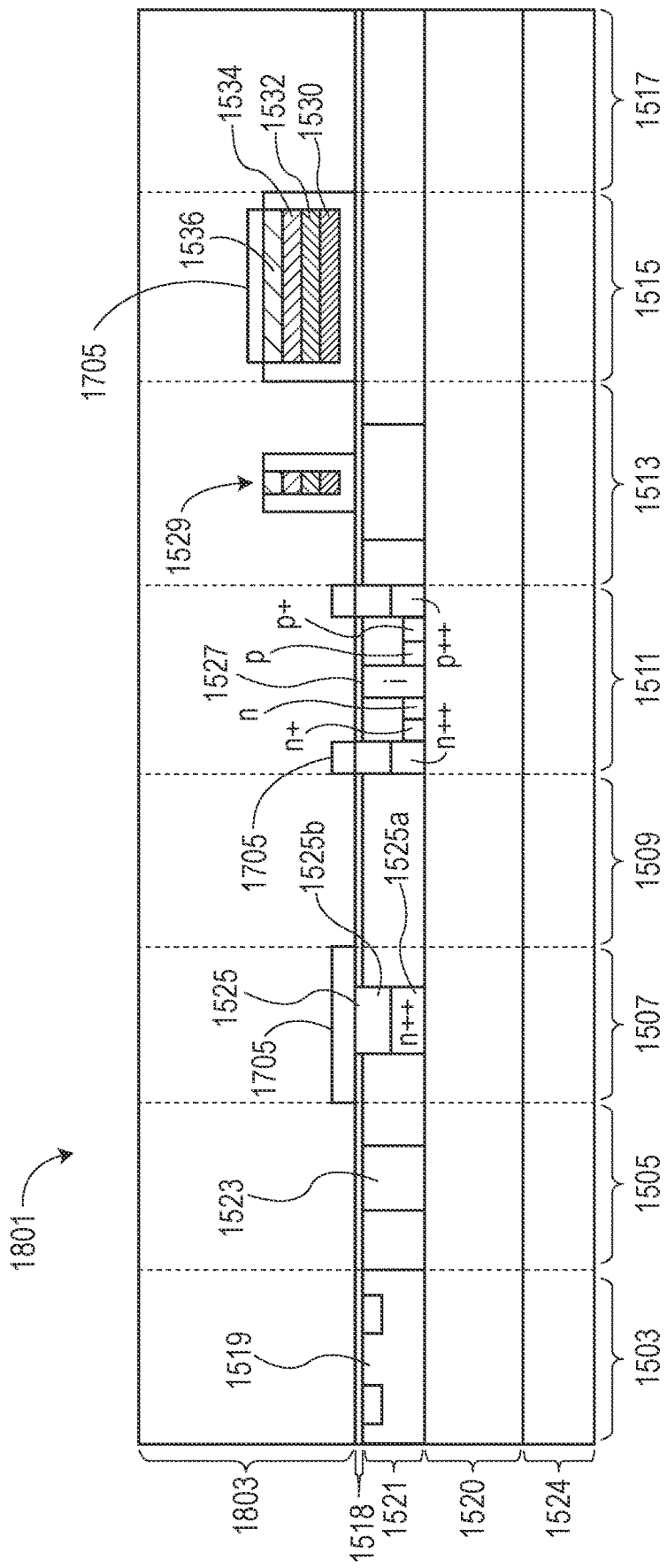
FIG. 18 illustrates an example of an oxide layer on an etched PIC according to certain embodiments.

In step 1407, an oxide deposition process (e.g., using middle of the line (MOL) $SiO_2$ deposition) is performed to form an oxide layer 1803 on the etched PIC as shown in FIG. 18.

In steps 1409, the patterned base PIC is prepared for a second lithography process. In this process, another layer deposition and lithographic patterning of the photoresist is performed as in step 1403.

Figure 19:
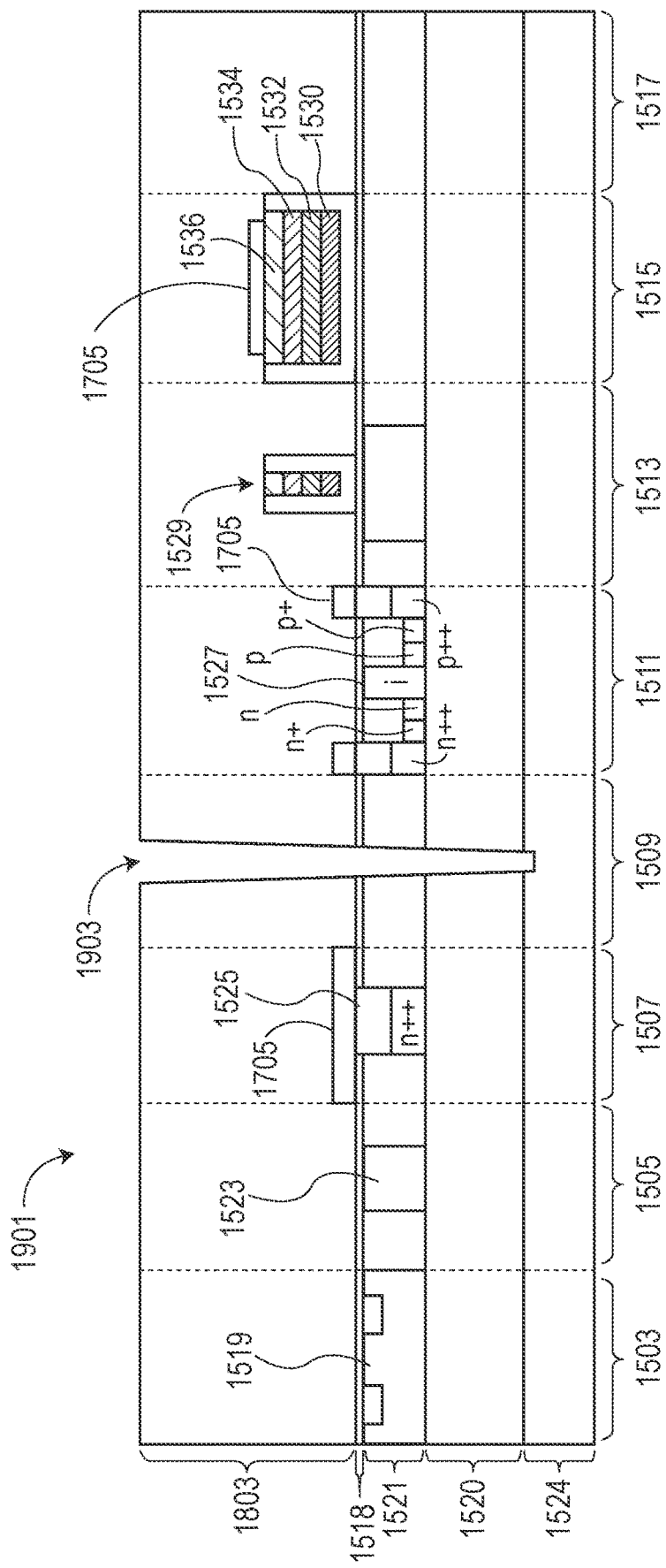
FIG. 19 illustrates an example of an etch process to form a trench structure in a thermal isolation region according to certain embodiments.

In step 1411, a second etch process is performed to generate a deep trench 1903 in the thermal isolation region (e.g., thermal isolation trench region 1509) as shown in FIG. 19. The deep trench 1903, referred to herein as a "deep trench," is a trench in the PIC stack that can extend all the way to the substrate 1524. Any suitable etch process can be used to etch the deep trench. Etching processes, such as oxide etching processes and the like, can be employed without departing from the scope of the present disclosure. In some embodiments, the etch can be a selective etch that etches the oxide but not the Si substrate. The etching process can be an anisotropic etching process to etch the deep trench 1903.

Figure 20:
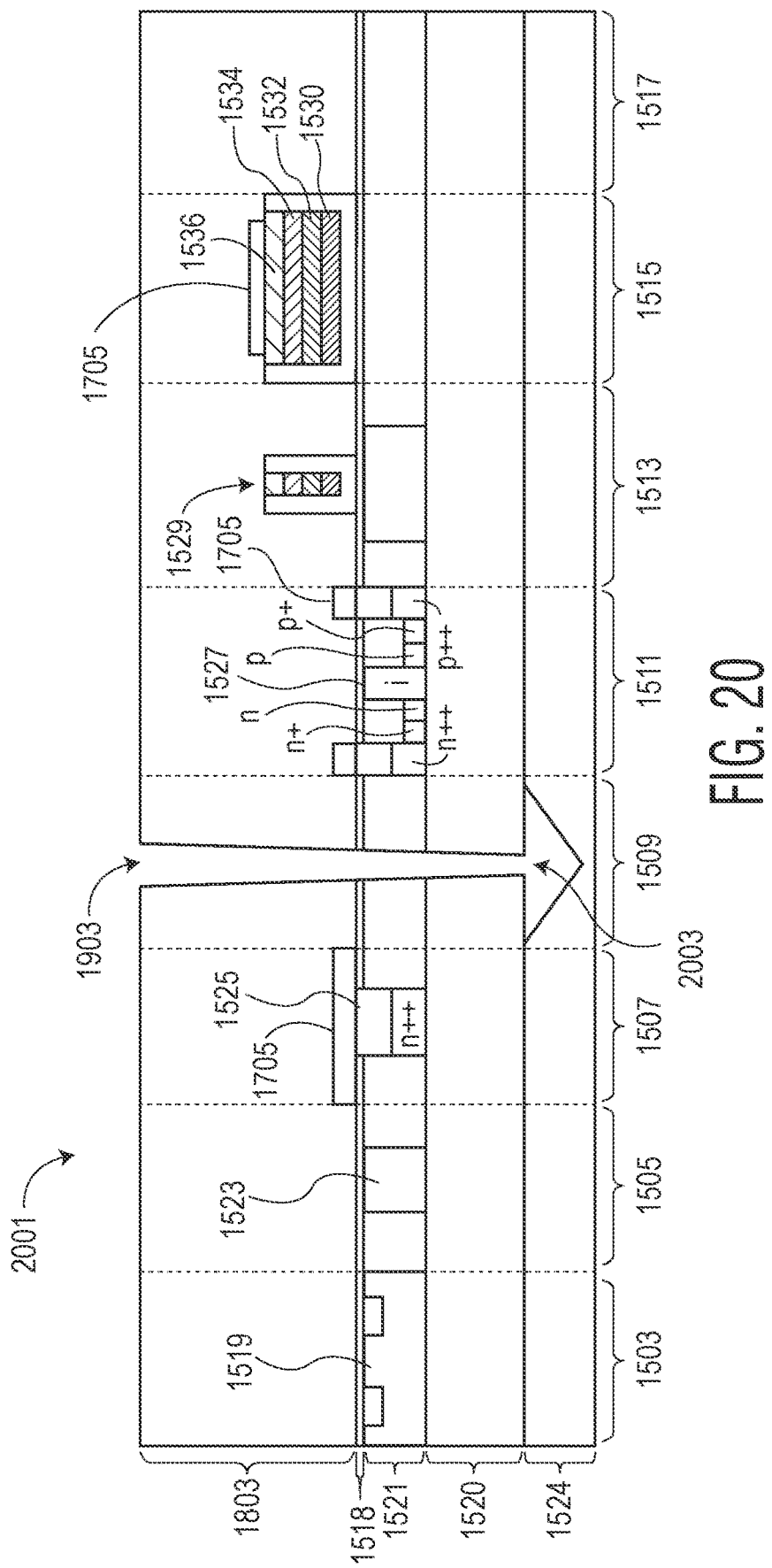
FIG. 20 illustrates an example of an etch process to form an undercut structure according to certain embodiments.

At step 1413, an undercut 2003 is etched in the substrate 1524 at the base of the deep trench 1903, as shown in FIG. 20. Such an undercut can be formed using a combination of dry and wet etch processes. The dry etch can be sulfur hexafluoride, a chlorine etch, or any other dry etch process that is a selective etch that will etch silicon but not oxide, such that only the silicon at the base of the deep trench 1903 is etched while the oxide layers above are preserved. A wet etch can then be performed using, for example, tetramethylammonium hydroxide (TMAH), KOH, or any other suitable etchants. In some embodiments, the etching of the silicon occurs along the 111 crystal plane (e.g., at about 54 degrees). Such an etch results in the undercut 2003 having angled walls resultant from etching the silicon.

Figure 21:
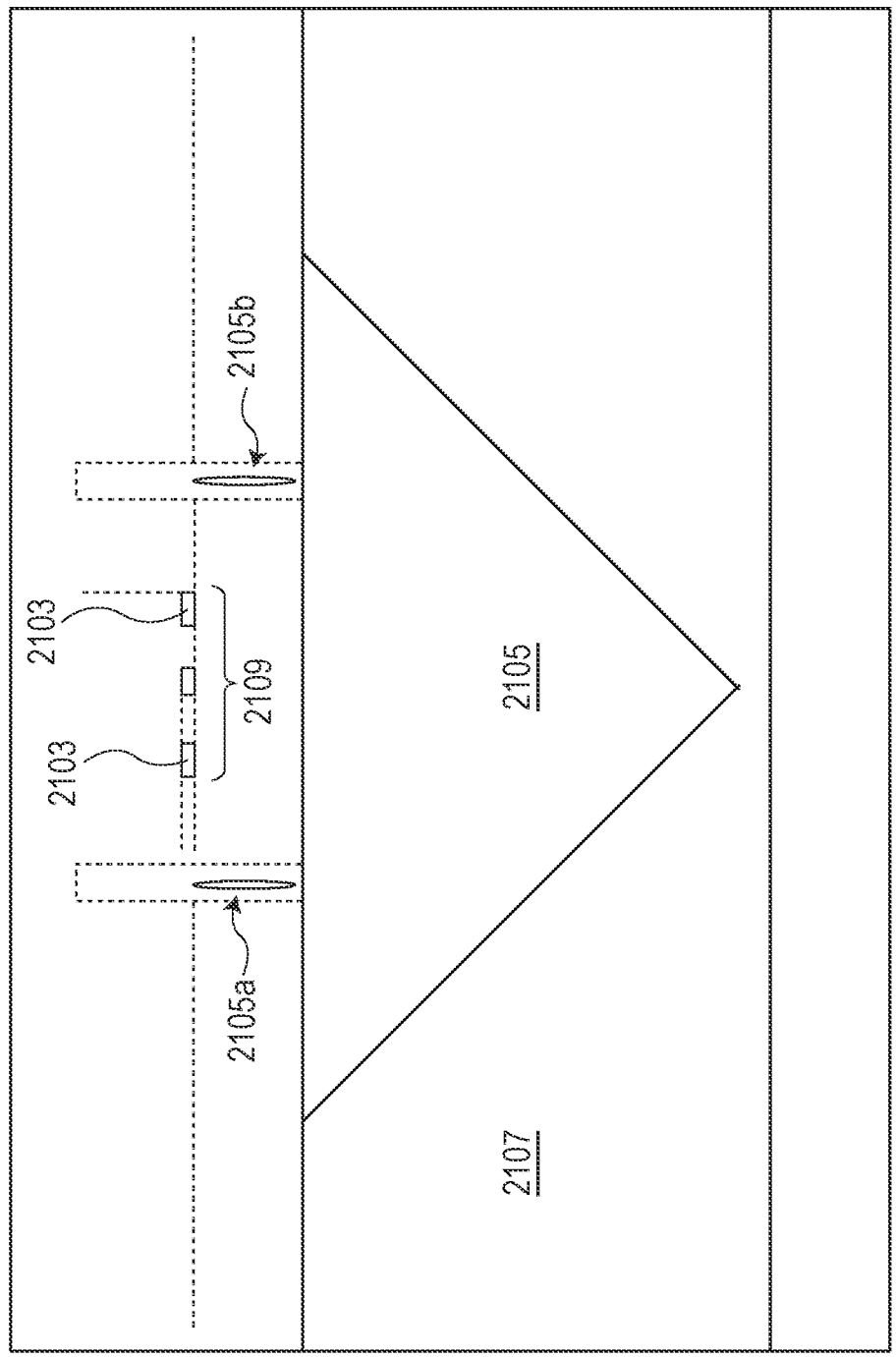
FIG. 21 illustrates an example of an undercut structure according to certain embodiments.

FIG. 21 illustrates one example of a heater 2103 and a full undercut structure 2105 in accordance with some embodiments. Full undercut structure 2105 may be an example of undercut 2003 shown in FIG. 20, and may be formed using etch processes described above with respect to FIG. 20. In some embodiments, undercut structure 2105 can be positioned underneath any photonic device 2109 that employs a heater. Thermal isolation from deep trenches and undercut structure 2105 may reduce or prevent heat loss into the surrounding substrate 2107. Examples of photonic devices 2109 include single photon sources, optical filters, Mach-Zehnder interferometers, micro ring resonators, or any other structures that may use thermal tuning and/or switching. In FIG. 21, an example is shown where two deep trenches 2105*a* and 2105*b* are each formed on a respective side of the waveguide and heaters in order to thermally isolate the heater elements from the surrounding regions, including the substrate (referred to here as the silicon handle) and the oxide layers. In some embodiments, a cooling member can be in thermal contact with the substrate to provide a head sink to the PIC during operation. For circuits that operate at cryogenic temperatures, the cooling member can be part of a larger cryostat that is cryogenically cooled. In such scenarios, without a thermal undercut structure disposed between the heater and the cooling structure, much of the heat generated by the heater may be shunted directly to the cooling structure, thereby negatively impacting the heating efficiency of the heater, and/or unnecessarily increasing the heat load on the cryogenic cooling system.

Figure 22:
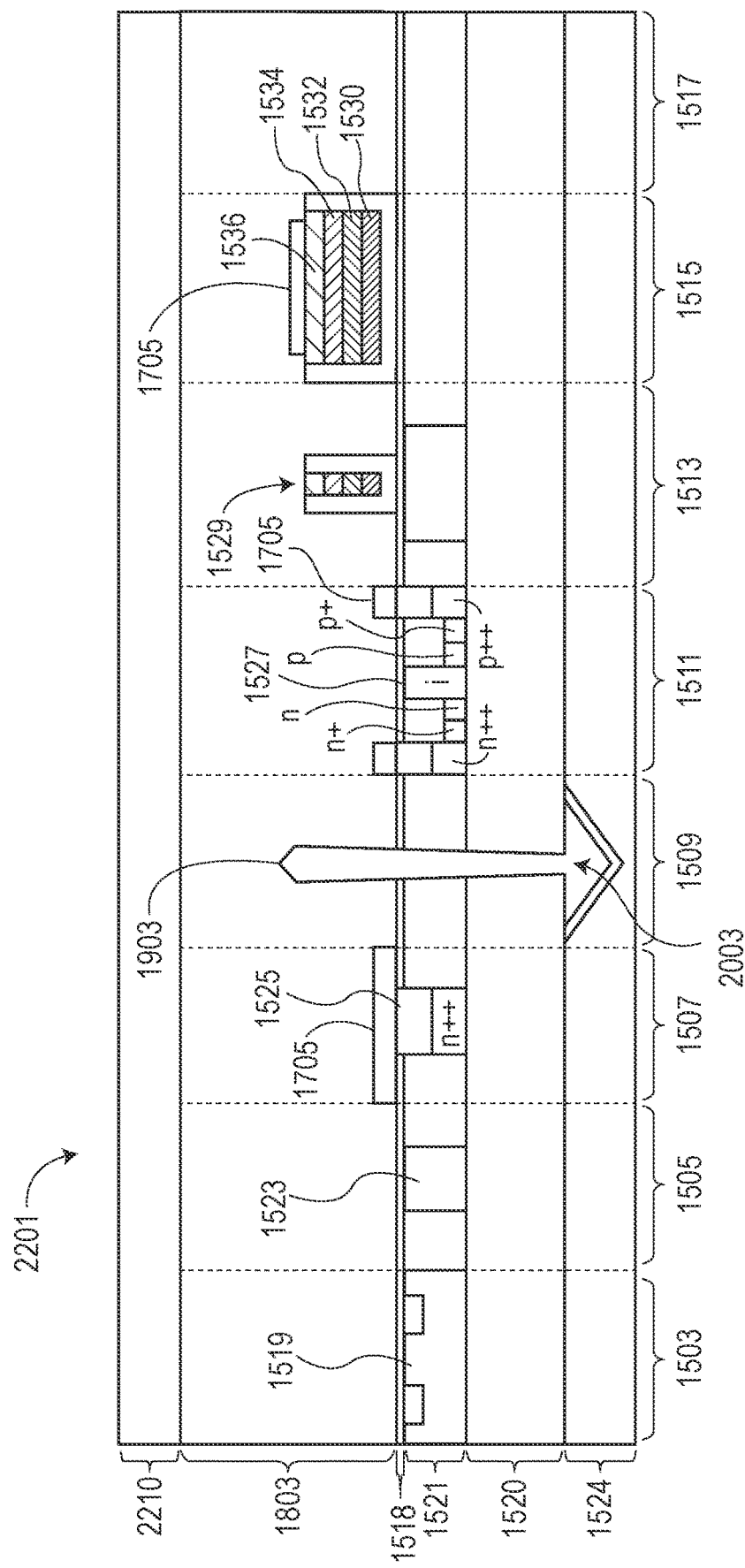
FIG. 22 illustrates an example of a process for forming an oxide layer that seal the trench structure and the undercut structure according to certain embodiments.

In step 1415, as illustrated in FIG. 22, an oxide layer 2210 is deposited on the PIC stack that includes deep trenches and undercuts for thermal isolation formed therein. The oxide layer 2210 may be planarized, for example, via chemical mechanical polishing (CMP). In some embodiments, oxide layer 2210 is deposited without breaking vacuum and thus seals the deep trench undercut regions such that these regions are kept sealed under vacuum. Keeping the deep trench and undercut regions under vacuum can improve the thermal isolation capabilities of the deep trench undercut structures by eliminating the most effective heat transfer mechanisms within the voids. For example, heat transfer through the deep trench occurs mainly via radiative transfer and more efficient processes such as diffusion, convection, and the like, are minimized.

Figure 23:
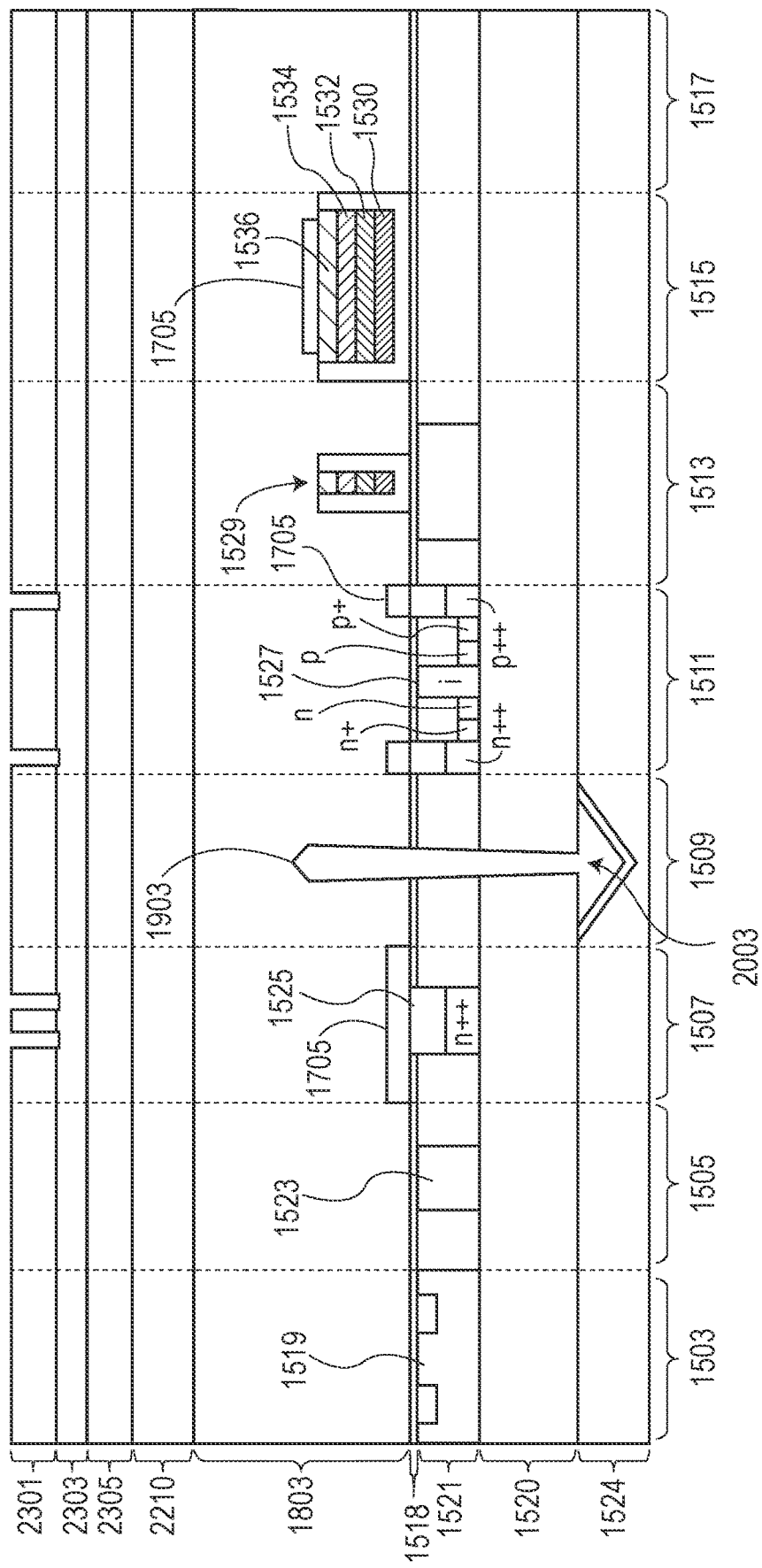
FIG. 23 illustrates examples of additional layers that can be deposited for use in a tri-layer lithography process according to certain embodiments.

In steps 1417, a patterned photoresist layer 2301 may be formed on the PIC stack for a third lithography process as shown in FIG. 23. In this process, another layer deposition and lithographic patterning of the photoresist is performed as in step 1403. For example, the patterned photoresist layer 2301 may be formed on a planarization layer 2305 and an antireflection coating layer 2303. In this case, patterning is performed to form etch mask for etching silicide contact holes.

Figure 24:
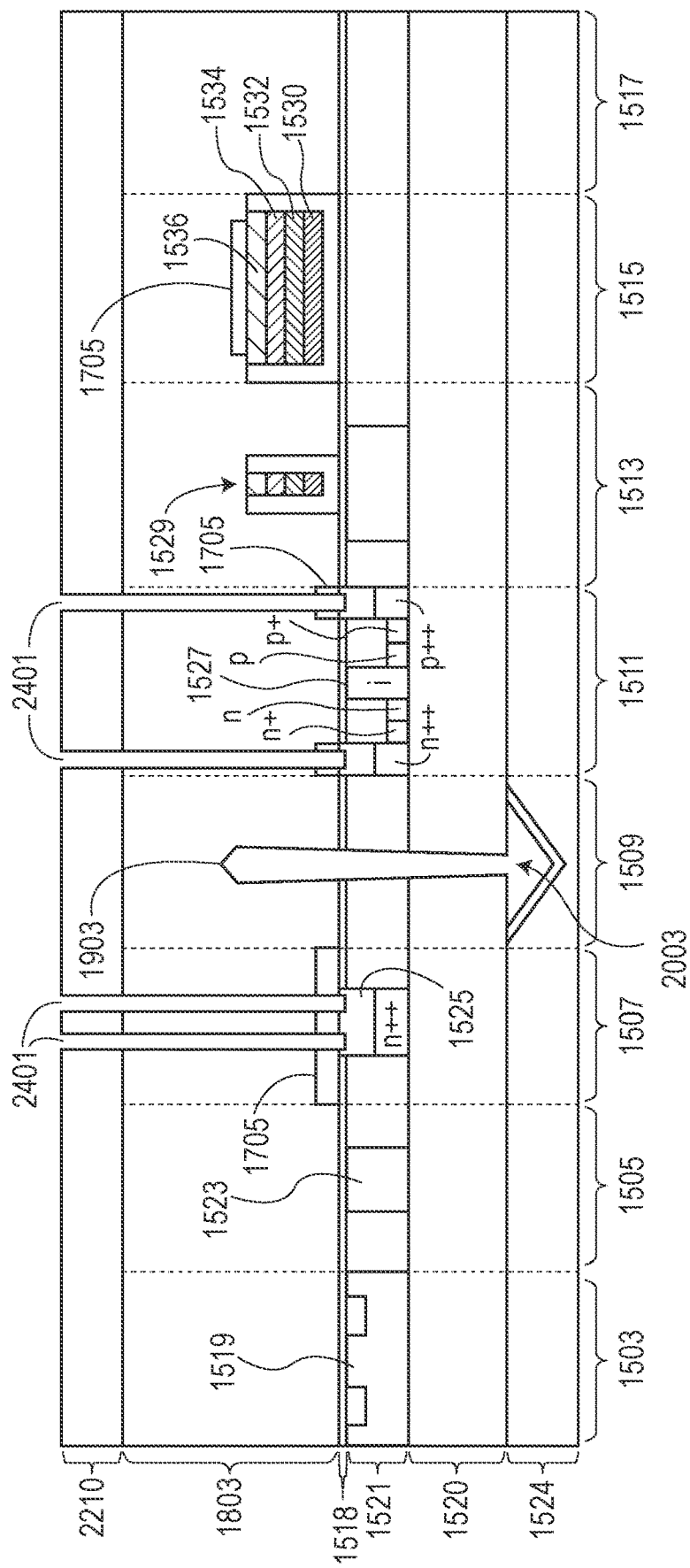
FIG. 24 illustrates examples of contact holes for forming electrical contacts according to certain embodiments.

In step 1419, an oxide etch process can be performed to etch oxide layer 2210, followed by a SiN punch process to etch spacers/caps 1705, thereby forming silicide contact holes 2401 for making contact with the silicide layer (e.g., capping layer 1525*b*), as shown in FIG. 24.

Figure 25:
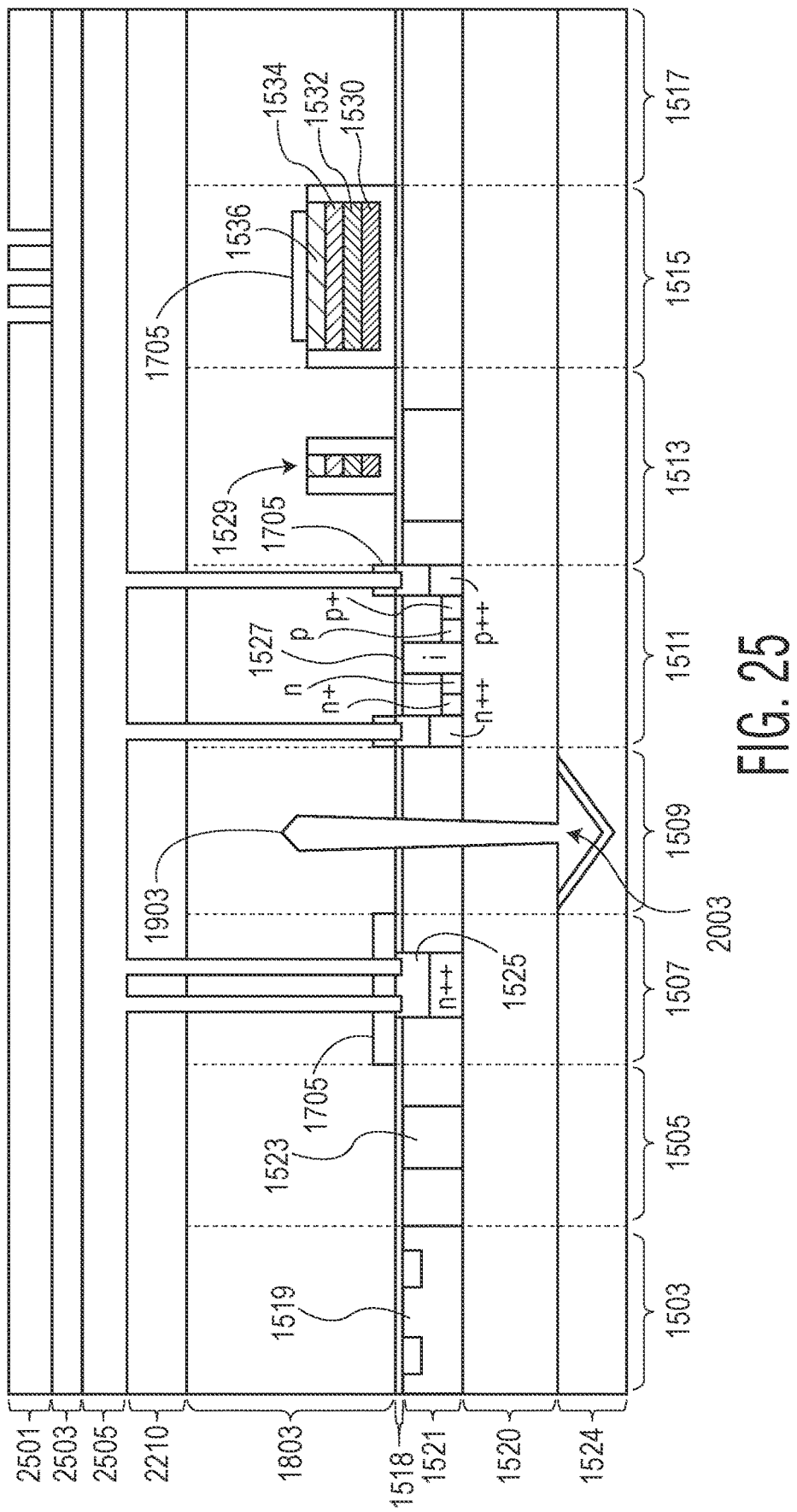
FIG. 25 illustrates examples of additional layers that can be deposited for use in a tri-layer lithography process according to certain embodiments.
Figure 26:
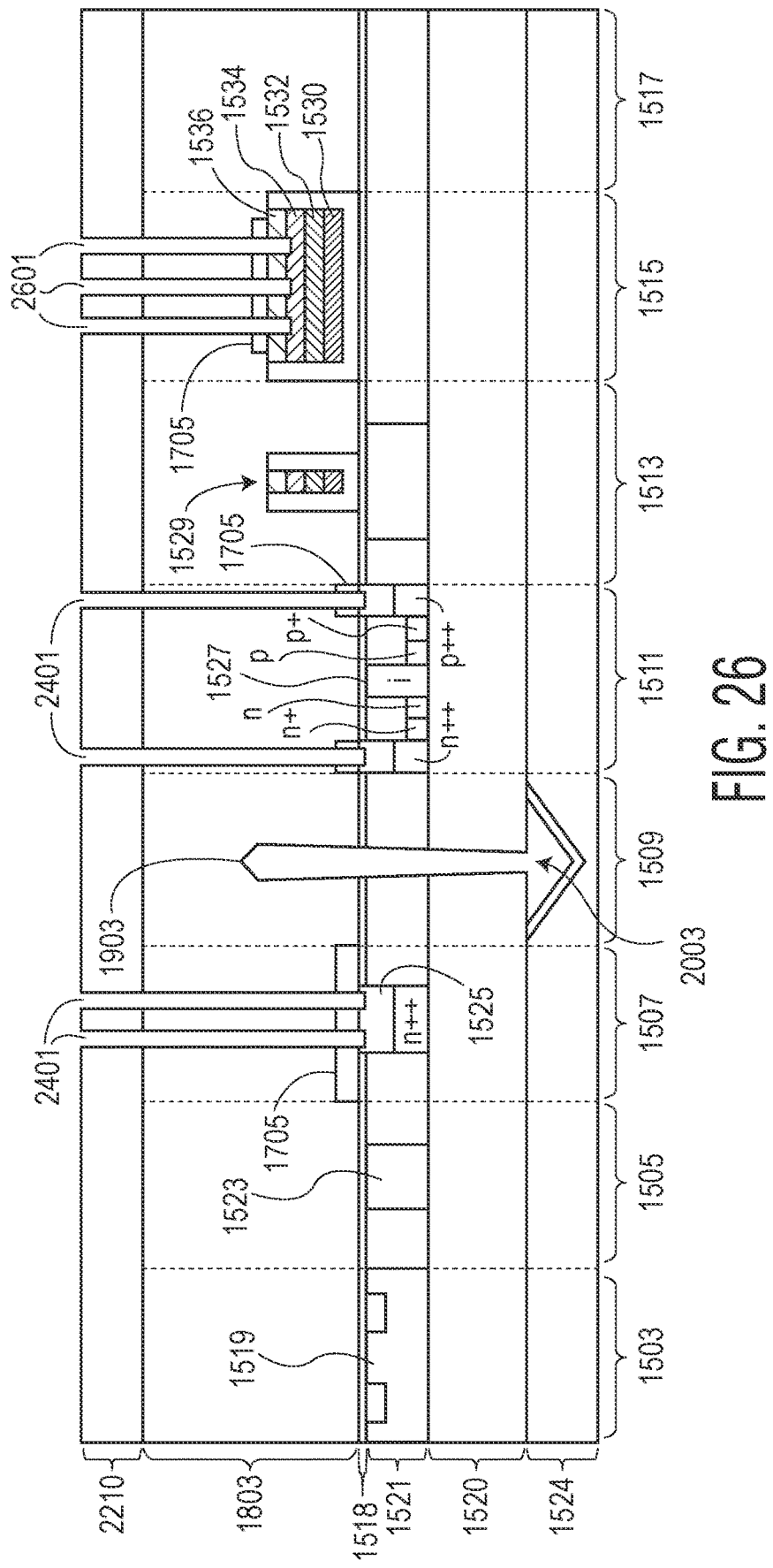
FIG. 26 illustrates examples of contact holes for forming electrical contacts for a photodetector according to certain embodiments.

In step 1421, a lithography preparation, lithography, and etch processes are performed in a manner similar to the above. For example, as shown in FIG. 25, a patterned photoresist layer 2501 may be formed on a planarization layer 2505 and an antireflection coating layer 2503. In this case, the photoresist layer 2501 is patterned to allow for etching of the photon detector contact holes, stopping at the appropriate layer of the photon detector, for example, at the amorphous silicon layer. As shown in FIG. 26, the planarization layer 2505 (e.g., SOH or OPL layer) may be removed to open up silicide contact holes 2401 and photon detector contact holes 2601.

Figure 27:
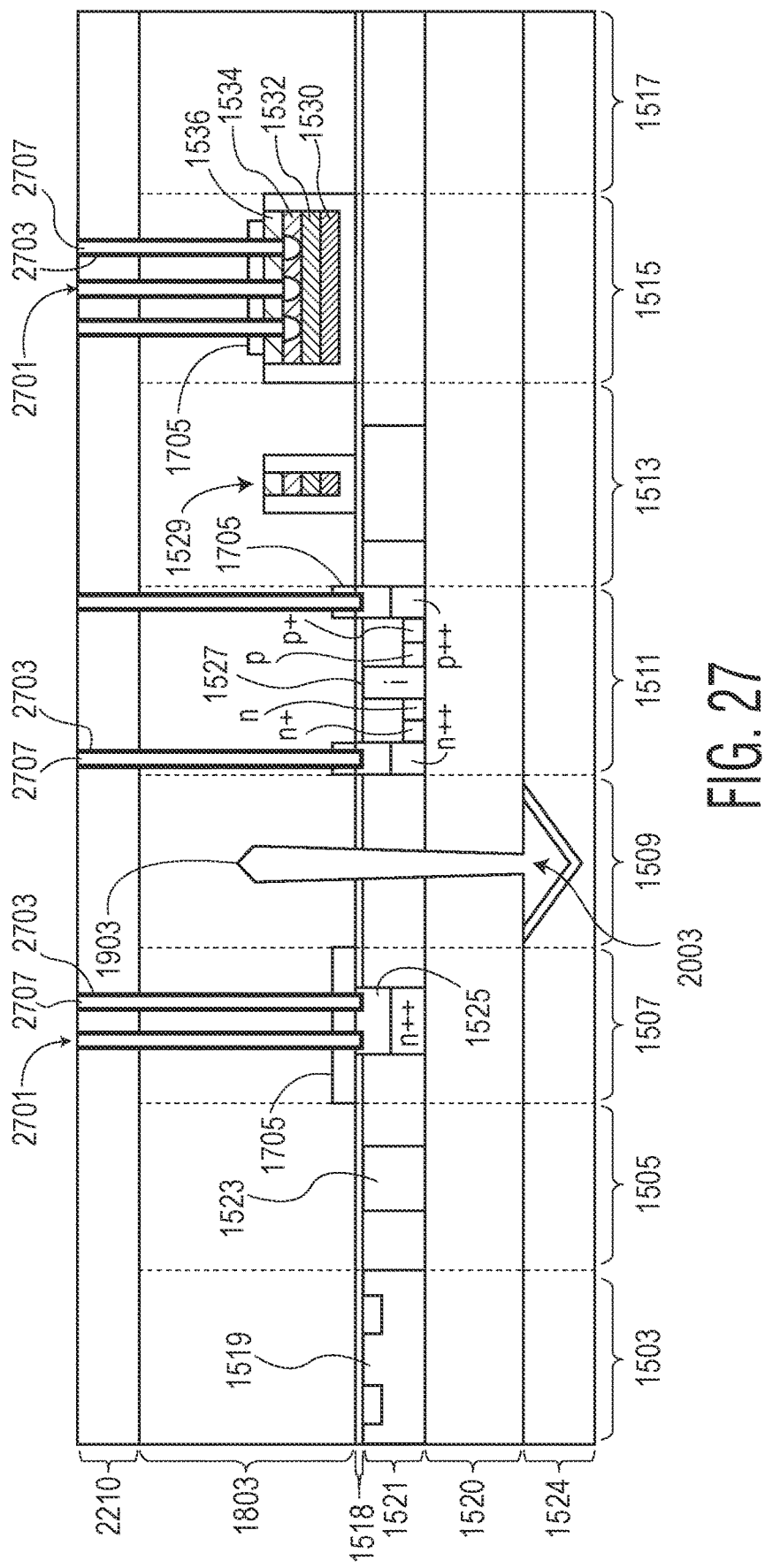
FIG. 27 illustrates examples of electrical contacts for photonic integrated circuits according to certain embodiments.

In step 1423, metal silicide contacts 2701 are formed as illustrated in FIG. 27. For example, a liner layer 2703 can first be deposited in the contact holes (e.g., silicide contact holes 2401 and photon detector contact holes 2601). In some embodiments, the liner layer 2703 can be formed from tungsten, tungsten carbide, tungsten nitride, or any other suitable liner. After the liner layer deposition, an anneal step can be performed to form silicide regions 2705 at the bottom of the metal silicide contacts 2701 for detector contact, such as the amorphous silicon layer 1534. Following the silicide formation, a metallization process is performed to fill the contact holes with a suitable contact metal 2707, such as, for example, tungsten, copper, aluminum, cobalt, and the like. In some embodiments, before the silicide formation, a cleaning step can be performed to clean the amorphous silicon. Any suitable cleaning step can be used, such as a chemical cleaning step, argon sputter, and the like.

Figure 28:
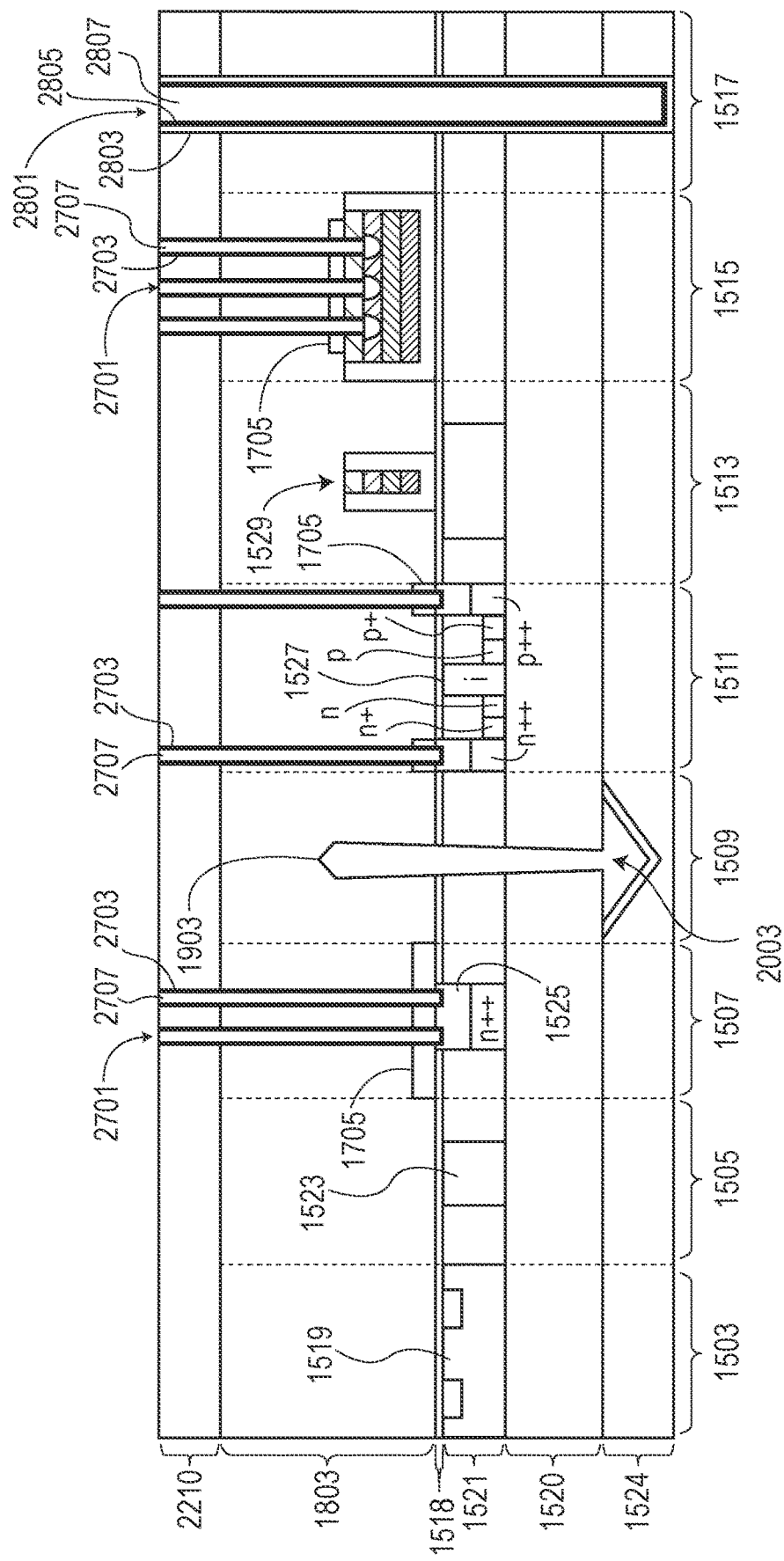
FIG. 28 illustrates an example of a scatter mitigation structure according to certain embodiments.

In step 1425, a scatter mitigation structure 2801 is formed using a lithography and etch process, as illustrated in FIG. 28. In some embodiments, the scatter mitigation structure 2801 can be formed in a deep trench that lands on the substrate 1524. In other embodiments, the scatter mitigation structure 2801 can be formed in a through silicon via (TSV)-like trench as shown in FIG. 28. After the trench is etched, an oxide liner 2803 is formed to prevent the fill material (that subsequently fills the scatter mitigation structure 2801) from reacting with the silicon. A metal liner layer 2805, such as a Ti—Cu barrier and seed layer, may then be formed on oxide liner 2803, before filling the scatter mitigation structure with a fill material 2807 (e.g., a metal, such as copper). The fill material 2807 may have a thermal expansion coefficient (CTE) similar to substrate 1524 and/or oxide. In some embodiments, the TSV-like scatter mitigation structure can be on the order of 10 of microns deep, e.g., 40-60 microns deep and thus, is much deeper than the thermal isolation trench (which can be a factor of 10 less deep).

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally, or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that, throughout this specification, discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A device comprising:
    a substrate;
    a dielectric layer on the substrate;
    a waveguide within the dielectric layer;
    a heater disposed in the dielectric layer;
    a thermal isolation structure including a trench in the dielectric layer and an undercut in the substrate; and
    a photodetector disposed above the waveguide and monolithically integrated with the substrate, the photodetector optically coupled to the waveguide and configured to operate at temperatures below 50 K.

2. The device of claim 1, wherein the heater is disposed proximate to the waveguide and configured to thermally tune a portion of the waveguide.

3. The device of claim 2, wherein the waveguide and the heater form a single photon generator, a ring oscillator, an optical filter, an optical switch, or an optical interferometer.

4. The device of claim 2, wherein the thermal isolation structure surrounds the heater.

5. The device of claim 4, wherein the undercut extends horizontally in the substrate and is under the portion of the waveguide.

6. The device of claim 4, wherein the trench and the undercut form a vacuum region.

7. The device of claim 4, further comprising a cooling structure disposed to be in thermal contact with the substrate, wherein the undercut is disposed between the heater and the cooling structure.

8. The device of claim 1, further comprising a plurality of light isolation structures in at least one of the substrate or the dielectric layer, the plurality of light isolation structures configured to prevent photons from reaching the photodetector other than through the waveguide.

9. The device of claim 8, wherein the plurality of light isolation structures includes at least one of:
    a metal trench in the dielectric layer and partially extending into the substrate;

a metal trench in the dielectric layer;
an array of metal vias in the dielectric layer;
a metal cover in the dielectric layer and on top of the photodetector; or
a deep trench in the substrate, the deep trench including an air gap or filled with a reflective or absorptive material.

10. The device of claim 9, wherein the metal cover is in a metal layer and is aligned with or coupled to the metal trench or the array of metal vias to form a contiguous structure surrounding the photodetector.

11. The device of claim 9, wherein:
the waveguide includes an input port; and
the metal trench or the array of metal vias is located at a region including the input port.

12. The device of claim 1, wherein the photodetector includes a superconducting nanowire single photon detector.

13. A method comprising:
receiving a wafer, the wafer including:
a substrate,
a dielectric layer on the substrate;
a waveguide formed in the dielectric layer;
a heating structure disposed in the dielectric layer;
a thermal isolation structure including a trench in the dielectric layer and an undercut in the substrate; and
a photodetector in the dielectric layer and coupled to the waveguide;
etching the trench in the dielectric layer to expose a first portion of the substrate, the trench surrounding the photodetector;
etching, through the trench, the substrate to form the undercut in the substrate; and
filling the trench and the undercut with a light reflective or light absorptive material.

14. The method of claim 13, wherein the heating structure is configured to thermally tune a portion of the waveguide.

15. The method of claim 14, further comprising:
etching a third set of vias or a third trench in the dielectric layer to expose a second portion of the substrate, the third set of vias or the third trench surrounding the heating structure;
etching, through the third set of vias or the third trench, the substrate to form an undercut in the substrate, the undercut positioned below the second portion of the waveguide; and
depositing an oxide layer on the dielectric layer to seal the third set of vias or the third trench and the undercut.

16. The method of claim 14, further comprising:
etching the dielectric layer to form contact holes for the heating structure; and
filling the contact holes with a conducting material to form electrical contacts for the heating structure.

17. The method of claim 13, further comprising, before the filling, forming an oxide liner layer in the second set of vias or the second trench and depositing a barrier and seed layer on the oxide liner layer.

18. The method of claim 13, further comprising forming a top metal cover on the dielectric layer and on top of the photodetector.

19. The method of claim 13, further comprising:
etching the dielectric layer to form contact holes for the photodetector; and
filling the contact holes with a conducting material to form electrical contacts for the photodetector.

20. The method of claim 19, wherein filling the contact holes comprises depositing a liner layer including tungsten, tungsten carbide, or tungsten nitride on sidewalls of the contact holes.

* * * * *